US012664912B2

(12) United States Patent
Seim et al.

(10) Patent No.: US 12,664,912 B2
(45) Date of Patent: *Jun. 23, 2026

(54) METHODS AND SYSTEMS TO FACILITATE SILENT COMMUNICATION

(71) Applicant: Georgia Tech Research Corporation, Atlanta, GA (US)

(72) Inventors: Caitlyn Seim, Atlanta, GA (US); Thad Eugene Starner, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 937 days.

This patent is subject to a terminal disclaimer.

(21) Appl. No.: 17/796,884

(22) PCT Filed: Feb. 5, 2021

(86) PCT No.: PCT/US2021/016766

§ 371 (c)(1),
(2) Date: Aug. 2, 2022

(87) PCT Pub. No.: WO2021/158886

PCT Pub. Date: Aug. 12, 2021

(65) Prior Publication Data

US 2023/0068531 A1    Mar. 2, 2023

Related U.S. Application Data

(60) Provisional application No. 62/971,284, filed on Feb. 7, 2020.

(51) Int. Cl.
*G09B 21/00*    (2006.01)
*G06F 3/01*    (2006.01)
*G10L 21/00*    (2013.01)

(52) U.S. Cl.
CPC ............ *G09B 21/00* (2013.01); *G06F 3/015* (2013.01); *G10L 21/00* (2013.01)

(58) Field of Classification Search
None
See application file for complete search history.

(56) References Cited

U.S. PATENT DOCUMENTS

| | | | |
|---|---|---|---|
| 2015/0310762 A1 | 10/2015 | Seim et al. | |
| 2017/0331563 A1 | 11/2017 | Tyler et al. | |
| 2019/0247662 A1 | 8/2019 | Poltroak | |
| 2021/0034154 A1* | 2/2021 | Segal | A61B 5/369 |

OTHER PUBLICATIONS

International Search Report and Written Opinion from Application No. PCT/US2021/016766 dated Apr. 29, 2021.

* cited by examiner

*Primary Examiner* — James B Hull
(74) *Attorney, Agent, or Firm* — TROUTMAN PEPPER LOCKE LLP; Ryan A. Schneider; Christopher C. Close, Jr.

(57) ABSTRACT

An exemplary embodiment of the present disclosure provides a method of communication, the method comprising receiving a signal from a subject, wherein the signal represents activity in a brain of the subject associated with one or more spatiotemporal movements of one or more portions of the subject's body, correlating the signal to a portion of a coded language system and outputting the portion of the coded language system.

19 Claims, 13 Drawing Sheets

200 start

Receive a signal from a subject, wherein the signal represents activity in a brain of the subject associated with one or more spatiotemporal movements of one or more portions of the subject's body — 202

Correlate the signal to a portion of a coded language system — 204

Output the portion of the coded language system. — 206

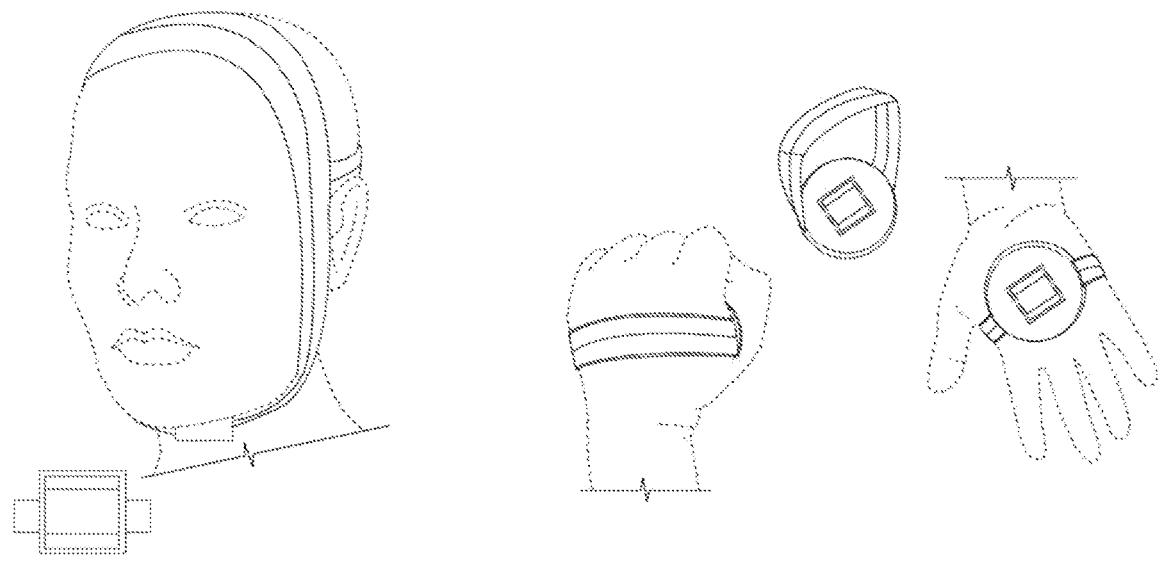
FIG. 8A
FIG. 8B
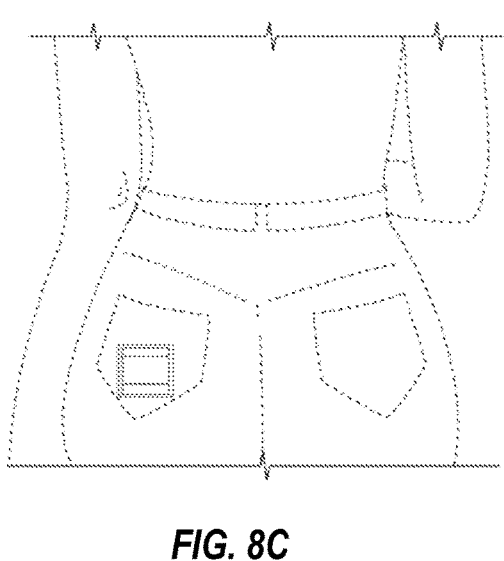
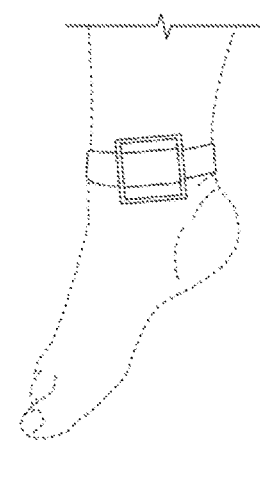
FIG. 8C
FIG. 8D

METHODS AND SYSTEMS TO FACILITATE SILENT COMMUNICATION

CROSS-REFERENCE TO RELATED APPLICATIONS

This application claims priority to, and the benefit under 35 U.S.C. § 119(e), of U.S. Provisional Application Ser. No. 62/971,284, filed 7 Feb. 2020, which is incorporated herein by reference in its entirety as if fully set forth below.

FIELD OF THE DISCLOSURE

The various embodiments of the present disclosure relate generally to methods and systems to facilitate communication of coded language systems using brain signals and bodily motions and methods and systems for teaching the coded language systems using passive haptic learning.

BACKGROUND

Silent communication techniques and/or devices can facilitate communication by observing and/or receiving non-auditory sources of information from an individual. Systems using brain computer interfaces can receive a signal, such as a brain signal, from an individual and convert the signal into a form of communication, such as speech or text. Augmentative and alternative communication ("AAC") methods encompass broad nonverbal communication methods, such as sign language, Braille, picture boards, and speech-generating devices (SGDs). These methods assist people who are unable to use verbal speech to communicate, and in some cases, allow a listener to understand what is being expressed. The most commonly used SGDs include eye-gaze, head tracking, joystick and alternative mouse controls, or single and multiple switch controls. Users of SGDs are often uncomfortable using voice interfaces in public spaces, and in some cases, the motor function of users of SGDs may diminish to a point where they lose motor control and their ability to control voice interfaces.

People suffering from the progressive neurodegenerative disease, amyotrophic lateral sclerosis (ALS), lose the ability to control all muscles, and may reach a state of complete "lock-in" where even eye movement is too erratic for controlling a voice interface. There are no commercial speech-generating methods or devices for people suffering from "locked-in" state, and many SGD systems are intolerably slow (below 3 words per minute). Previous methods for decoding speech from brain signals relies on invasive implanted electrodes or electrode arrays within a person's brain. See, for example, US Publication No. 20190333505. However, these methods can be dangerous and implanted electrodes are known to erode and stop working.

For individuals in a "locked-in" state, there is a need for non-invasive and fast methods for enabling them to communication again. There is also a desire for methods that would enable any individual (disabled or not) to silently communicate using brain signals. Embodiments of the present disclosure allow for communication using non-invasive methods of converting a brain signal associated with a bodily movement into text or speech. In addition, embodiments of the present disclosure provide methods and systems for passively teaching an individual a coded language system correlated to a chorded system, such as Brialle, mapped on their body.

BRIEF SUMMARY

Disclosed herein are methods, computer readable media, and systems to facilitate communication using a signal from a subject associated with one or more spatiotemporal movements. Also disclosed herein are methods, computer readable media, and systems to convey a chorded system. In some embodiments, the chorded system is conveyed via (passive and/or active) haptic learning technology. Haptic, as used herein, means of or relating to the sense of touch. Haptic learning technology can include tactile feedback technology that recreates the sense of touch by, for instance, applying a sensation (e.g., via forces, vibrations, electrical shocks, and/or motions) to the user via a wearable, tactile interface. Passive Haptic Learning (PHL) refers to the acquisition of sensorimotor skills without active attention to learning (i.e., allowing a person to learn "muscle memory" through a sensory stimulus without devoting attention to the stimulus). The sensorimotor skills learned can relate to a variety of applications including, but not limited to, Braille, musical instruments, code-based systems, text-entry systems, rehabilitation, or the like.

The present disclosure relates to methods of communication. An exemplary embodiment of the present disclosure provides a method of communication comprising receiving a signal from a subject, correlating the signal to a portion of a coded language system, and outputting the portion of the coded language system. The signal can represent or be the result of activity in a brain of the subject. The signal can be associated with one or more spatiotemporal movements of one or more portions of the subject's body.

In any of the embodiments disclosed herein, the method can further comprise demonstrating to the subject the one or more spatiotemporal movements associated with the portion of the coded language system.

In any of the embodiments disclosed herein, demonstrating to the subject the one or more spatiotemporal movements associated with the portion of the coded language system can comprise applying one or more stimuli to the subject.

In any of the embodiments disclosed herein, one or more stimuli can comprise one or more of auditory, visual, tactile, gustatory, olfactory stimuli, or any combination thereof.

In any of the embodiments disclosed herein, at least one of the one or more stimuli can comprise a tactile stimulation of the one or more portions of the subject's body.

In any of the embodiments disclosed herein, the one of more portions of the subject's body can comprise an organ, a muscle, a tendon, a joint, a bone, skin, cartilage, or any combinations thereof.

In any of the embodiments disclosed herein, the one or more portions of the subject's body can comprise an eye, an ear, a mandible, a temple, a tongue, teeth, a buccal, a shoulder, a bicep, an elbow, a hand, a wrist, a finger, a fingernail, an abdominal, a buttocks, a thigh, a knee, an ankle, a foot, an ankle bone, a toe, a toenail or any combination thereof.

In any of the embodiments disclosed herein, the tactile stimulation can comprise temporally separated tactile stimuli.

In any of the embodiments disclosed herein, the tactile stimulation can comprise vibrational or electrical tactile stimulation.

In any of the embodiments disclosed herein, the tactile stimulation can be electrical tactile stimulation. The electrical tactile stimulation can be selected from the group consisting of electrical muscle stimulation, transcutaneous electrical nerve stimulation, functional electrical stimulation, neuromuscular electrical stimulation, and Russian electrical stimulation.

In any of the embodiments disclosed herein, the one or more spatiotemporal movements can comprise executed actions, attempted actions, imagined actions, or combinations thereof.

In any of the embodiments disclosed herein, the coded language system can comprise text.

In any of the embodiments disclosed herein, the text can comprise letters, words, phrases, or combinations thereof.

In any of the embodiments disclosed herein, the text can be associated to a chorded system.

In any of the embodiments disclosed herein, the chorded system can comprise less than 26-points.

In any of the embodiments disclosed herein, the chorded system can comprise less than 14-points.

In any of the embodiments disclosed herein, the chorded system can comprise less than 12-points.

In any of the embodiments disclosed herein, the chorded system can comprise less than 10-points.

In any of the embodiments disclosed herein, the chorded system can comprise less than 9-points.

In any of the embodiments disclosed herein, the chorded system can comprise less than 8-points.

In any of the embodiments disclosed herein, the chorded system can comprise less than 7-points.

In any of the embodiments disclosed herein, the chorded system can comprise less than 6-points.

In any of the embodiments disclosed herein, the chorded system can comprise one or more of Braille, CyKey, SiWriter, GKOS, EkaPad, FrogPad, Decatxt, Twiddler, ASETNIOP, stenotype, velotype, Microwriter, or combinations thereof.

In any of the embodiments disclosed herein, each portion of the chorded system can be correlated to one or more spatiotemporal movements of one or more portion of the subject's body.

In any of the embodiments disclosed herein, at least one portion of the chorded system can be correlated to a combination of a first spatiotemporal movement of a first portion of the subject's body and a second spatiotemporal movement of a second portion of the subject's body.

In any of the embodiments disclosed herein, the one or more portions of the subject's body can comprise an organ, a muscle, a tendon, a joint, a bone, skin, cartilage, or any combinations thereof.

In any of the embodiments disclosed herein, the one or more portions of the subject's body can comprise an eye, an ear, a mandible, a temple, a tongue, teeth, a buccal, a shoulder, a bicep, an elbow, a hand, a wrist, a finger, a fingernail, an abdominal, a buttocks, a thigh, a knee, an ankle, a foot, an ankle bone, a toe, a toenail or any combination thereof.

In any of the embodiments disclosed herein, the signal can be received at a non-invasive receiver.

In any of the embodiments disclosed herein, the non-invasive receiver can comprise a functional magnetic resonance imaging (fMRI) system.

In any of the embodiments disclosed herein, the non-invasive receiver can comprise a functional near infrared (fNIR) imaging system.

In any of the embodiments disclosed herein, the non-invasive receiver can comprise a positron emission tomography (PET) imaging system.

In any of the embodiments disclosed herein, the non-invasive receiver can comprise an electroencephalogram (EEG) system.

In any of the embodiments disclosed herein, the non-invasive receiver can comprise a transcranial magnetic stimulation (TMS) system.

In any of the embodiments disclosed herein, the non-invasive receiver can comprise a brain-computer interface.

In any of the embodiments disclosed herein, the signal can be received by an invasive receiver.

In any of the embodiments disclosed herein, the invasive receiver can comprise an implanted electrode, a multielectrode array, a group of electrodes, or combinations thereof.

In any of the embodiments disclosed herein, receiving the signal from the subject can be indicative of a blood oxygenation level-dependent (BOLD) response in the subject.

In any of the embodiments disclosed herein, the method can further comprise outputting the portion of the coded language system into text.

In any of the embodiments disclosed herein, the method can further comprise outputting the portion of the coded language system into speech.

An exemplary embodiment of the present disclosure provides a communication system comprising a receiver and a controller. The receiver can be configured to receive a signal from a subject. The signal can represent activity in a brain of the subject. The signal can be associated with one or more spatiotemporal movements of one or more portions of the subject's body. The controller can be configured to correlate the signal to a portion of a coded language system. The controller can optionally output the portion of the coded language system.

In any of the embodiments disclosed herein, the system can further comprise a plurality of actuators configured to stimulate the one or more portions of the subject's body.

In any of the embodiments disclosed herein, the plurality of actuators can comprise a vibration motor, an electrode, a speaker, a bone-conduction device, or any combination thereof.

In any of the embodiments disclosed herein, the plurality of actuators can be positioned on or within a wearable device configured to stimulate the one or more portions of the subject's body.

In any of the embodiments disclosed herein, the one or more portions of the subject's body can comprise an organ, a muscle, a tendon, a joint, or any combinations thereof.

In any of the embodiments disclosed herein, the one or more portions of the subject's body can comprise an eye, a tongue, a buccal, a shoulder, a bicep, a hand, a wrist, a finger, an abdominal, a buttocks, a thigh, a knee, an ankle, a foot, a toe, or any combination thereof.

In any of the embodiments disclosed herein, the receiver can comprise a non-invasive receiver.

In any of the embodiments disclosed herein, the non-invasive receiver can comprise a brain computer interface, an MRI system, an NIR system, a PET system, an EEG system, a TMS system, or any combination thereof.

In any of the embodiments disclosed herein, the receiver can observe the signal from the subject, the signal can be indicative of a blood oxygenation level-dependent (BOLD) response in the subject.

In any of the embodiments disclosed herein, the receiver can comprise an invasive receiver.

In any of the embodiments disclosed herein, the invasive receiver can comprise an implanted electrode, a multielectrode array, a group of electrodes, or combinations thereof.

In any of the embodiments disclosed herein, the one or more spatiotemporal movements can comprise executed actions, imagined actions, or combinations thereof.

In any of the embodiments disclosed herein, the controller can be further configured to convert the portion of the coded language system into text or speech.

An exemplary embodiment of the present disclosure provides a method of screening a subject for invasive receiver compatibility. The method can comprise demonstrating to a subject one or more spatiotemporal movements associated with a portion of a coded language system, receiving a signal from the subject, and correlating the signal to a portion of the coded language system. The demonstrating can comprise applying one or more stimuli to the subject. The signal can represent activity in a brain of the subject associated with the one or more spatiotemporal movements.

These and other aspects of the present disclosure are described in the Detailed Description below and the accompanying drawings. Other aspects and features of embodiments will become apparent to those of ordinary skill in the art upon reviewing the following description of specific, exemplary embodiments in concert with the drawings. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The following detailed description of specific embodiments of the disclosure will be better understood when read in conjunction with the appended drawings. For the purpose of illustrating the disclosure, specific embodiments are shown in the drawings. It should be understood, however, that the disclosure is not limited to the precise arrangements and instrumentalities of the embodiments shown in the drawings.

FIG. 3A shows fMRI of the motor cortex during repeated executing or imagining executing American Sign Language (ALS) for "CHAIR" and/or "BED. " FIG. 3B depicts an example BOLD response (%) versus time (sec) while executing, attempting, or imagining an action, in accordance with an exemplary embodiment of the present disclosure.

FIG. 4A depicts the Braille dot alphabet and FIG. 4B depicts an example re-designed Braille dot alphabet mapped to different body parts, in accordance with an exemplary embodiment of the present disclosure.

FIGS. 8A-8D show example placement of actuators for stimulating a one or more body parts of a subject, in accordance with an exemplary embodiment of the present disclosure.

FIG. 11B shows a confusion matrix for the state of individual Braille dot using 6 second intervals. FIG. 11C shows a confusion matrix for the state of individual Braille dot using 3 second intervals.

DETAILED DESCRIPTION

Figure 1:
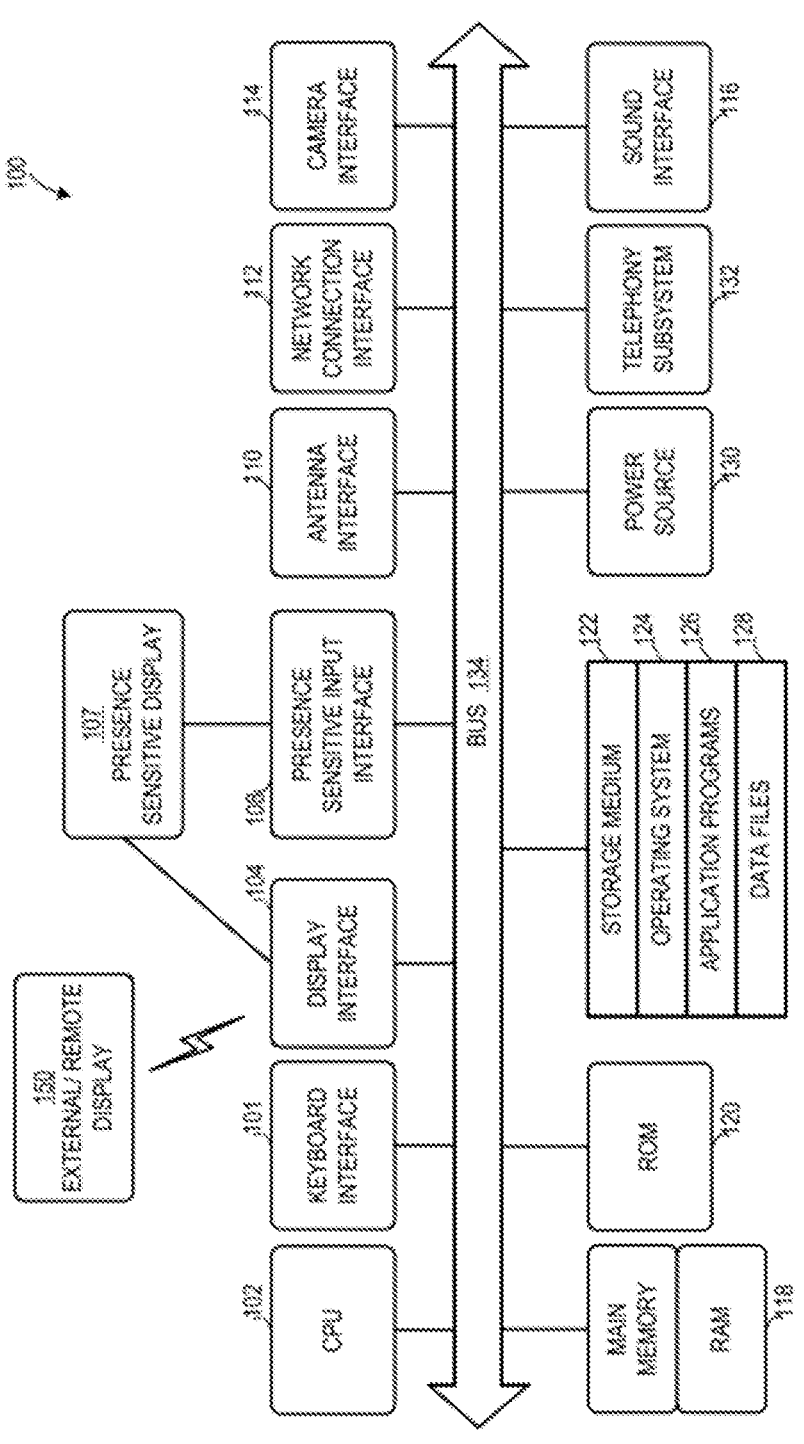
FIG. 1 depicts a block diagram of illustrative computing device architecture 100, according to an example implementation.

To facilitate an understanding of the principles and features of the present disclosure, various illustrative embodiments are explained below. The components, steps, and materials described hereinafter as making up various elements of the embodiments disclosed herein are intended to be illustrative and not restrictive. Many suitable components, steps, and materials that would perform the same or similar functions as the components, steps, and materials described herein are intended to be embraced within the scope of the disclosure. Such other components, steps, and materials not described herein can include, but are not limited to, similar components or steps that are developed after development of the embodiments disclosed herein.

Some embodiments disclosed herein include methods for communication through signals from a subject, where the signals can be associated to a subject's one or more spatiotemporal movements correlated to a coded language system. In some embodiments, the method can also use a wearable system (i.e., wearable by the user) that can teach the coded language system, such as chorded systems (e.g., Braille, Twiddler, stenotype, Microwriter, piano, ASL and combinations thereof) through sensory input (e.g., vibrational or electrical stimuli), with or without the active attention of the user. These systems have been demonstrated to be effective teaching tools through user studies, as demonstrated herein. The systems, methods and apparatuses disclosed herein can teach users how and when to motion, with their bodies, to communicate using these chorded systems. This disclosure presents a methodology, used in an example herein for passive haptic learning systems, of teaching these chorded communication systems using sequential and/or simultaneous stimuli.

Some embodiments of the disclosed technology will be described more fully hereinafter with reference to the accompanying drawings. This disclosed technology can, however, be embodied in many different forms and should not be construed as limited to the embodiments set forth therein.

In the following description, numerous specific details are set forth. However, it is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

In some instances, a computing device may be referred to as a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a set of hardware components.

Various aspects described herein may be implemented using standard programming or engineering techniques to produce software, firmware, hardware, or any combination thereof to control a computing device to implement the disclosed subject matter. A computer-readable medium may include, for example: a magnetic storage device such as a hard disk, a floppy disk or a magnetic strip; an optical storage device such as a compact disk (CD) or digital versatile disk (DVD); a smart card; and a flash memory device such as a card, stick or key drive, or embedded component. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

Various systems, methods, and computer-readable mediums are disclosed for conveying chorded systems and will now be described with reference to the accompanying figures.

FIG. 1 depicts a block diagram of an illustrative computing device architecture 100, according to an example embodiment. Certain aspects of FIG. 1 may be embodied in a computing device 100. As desired, embodiments of the disclosed technology may include a computing device with more or less of the components illustrated in FIG. 1. It will be understood that the computing device architecture 100 is provided for example purposes only and does not limit the scope of the various embodiments of the present disclosed systems, methods, and computer-readable mediums.

The computing device architecture 100 of FIG. 1 includes a CPU 102, where computer instructions are processed; a display interface 104 that acts as a communication interface and provides functions for rendering video, graphics, images, and/or texts on the display. In certain embodiments of the disclosed technology, the display interface 104 may be directly connected to a local display, such as a touch-screen display associated with a mobile computing device. In another example embodiment, the display interface 104 may be configured for providing data, images, text, and other information for an external/remote display that is not necessarily physically connected to the mobile computing device. For example, a desktop monitor may be utilized for mirroring graphics and other information that is presented on a mobile computing device. In certain some embodiments, the display interface 104 may wirelessly communicate, for example, via a Wi-Fi channel or other available network connection interface 112 to the external/remote display.

In an example embodiment, the network connection interface 112 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device architecture 100 may include a keyboard interface 106 that provides a communication interface to a keyboard. In one example embodiment, the computing device architecture 100 may include a presence-sensitive display interface 107 for connecting to a presence-sensitive display. According to certain some embodiments of the disclosed technology, the presence-sensitive display interface 107 may provide a communication interface to various devices such as a pointing device, a touch screen, a depth camera, etc. which may or may not be associated with a display.

The computing device architecture 100 may be configured to use an input device via one or more of input/output interfaces (for example, the keyboard interface 106, the display interface 104, the presence sensitive display interface 107, network connection interface 112, camera interface 114, sound interface 116, etc.) to allow a user to capture information into the computing device architecture 100. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like.

Additionally, the input device may be integrated with the computing device architecture 100 or may be a separate device. For example, the input device may be an accelerometer, a magnetometer, a digital camera, a microphone, and an optical sensor.

Example embodiments of the computing device architecture 100 may include an antenna interface 110 that provides a communication interface to an antenna; a network connection interface 112 that provides a communication interface to a network. In certain embodiments, a camera interface 114 is provided that acts as a communication interface and provides functions for capturing digital images from a camera. In certain embodiments, a sound interface 116 is provided as a communication interface for converting sound into electrical signals using a microphone and for converting electrical signals into sound using a speaker. According to example embodiments, a random-access memory (RAM) 118 is provided, where computer instructions and data may be stored in a volatile memory device for processing by the CPU 102.

According to an example embodiment, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example embodiment, the computing device architecture 100 includes a storage medium 122 or other suitable type of memory (e.g., RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 124, application programs 126 (including, for example, a web browser application, a widget or gadget engine, and or other applications, as necessary) and data files 128 are stored. According to an example embodiment, the computing device architecture 100 includes a power source 130 that provides an appropriate alternating current (AC) or direct current (DC) to power components. According to an example embodiment, the computing device architecture 100 includes a telephony subsystem 132 that allows the transmission and receipt of sound over a telephone network. The constituent devices and the CPU 102 communicate with each other over a bus 134.

According to an example embodiment, the CPU 102 has appropriate structure to be a computer processor. In one arrangement, the CPU 102 may include more than one processing unit. The RAM 118 interfaces with the computer bus 134 to provide quick RAM storage to the CPU 102 during the execution of software programs such as the operating system application programs, and device drivers. More specifically, the CPU 102 loads computer-executable process steps from the storage medium 122 or other media into a field of the RAM 118 in order to execute software programs. Data may be stored in the RAM 118, where the data may be accessed by the computer CPU 102 during execution. In one example configuration, the device architecture 100 includes at least 125 MB of RAM, and 256 MB of flash memory.

The storage medium 122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 122, which may comprise a machine-readable storage medium.

According to one example embodiment, the term computing device, as used herein, may be a CPU, or conceptualized as a CPU (for example, the CPU 102 of FIG. 1). In this example embodiment, the computing device may be coupled, connected, and/or in communication with one or more peripheral devices, such as display. In this example embodiment, the computing device may output content to its local display and/or speaker(s). In another example embodiment, the computing device may output content to an external display device (e.g., over Wi-Fi) such as a TV or an external computing system.

In some embodiments of the disclosed technology, the computing device 100 may include any number of hardware and/or software applications that are executed to facilitate any of the operations. In some embodiments, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various embodiments of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

An exemplary embodiment of the present disclosure provides a method of communication. The method of communication can include text and/or data entry input with auditory and/or text output. In some embodiments, the communication is silently conducted, for example, text-input from a mobile device can be generated on the mobile device using the method described herein and without physically typing the text. As would be appreciated by those of skill in the relevant art, a subject that is unable to communicate using verbal or written methods can benefit from a method of communicating using executed actions, attempted actions and/or imagined actions in combination with the method described herein.

Figure 2:
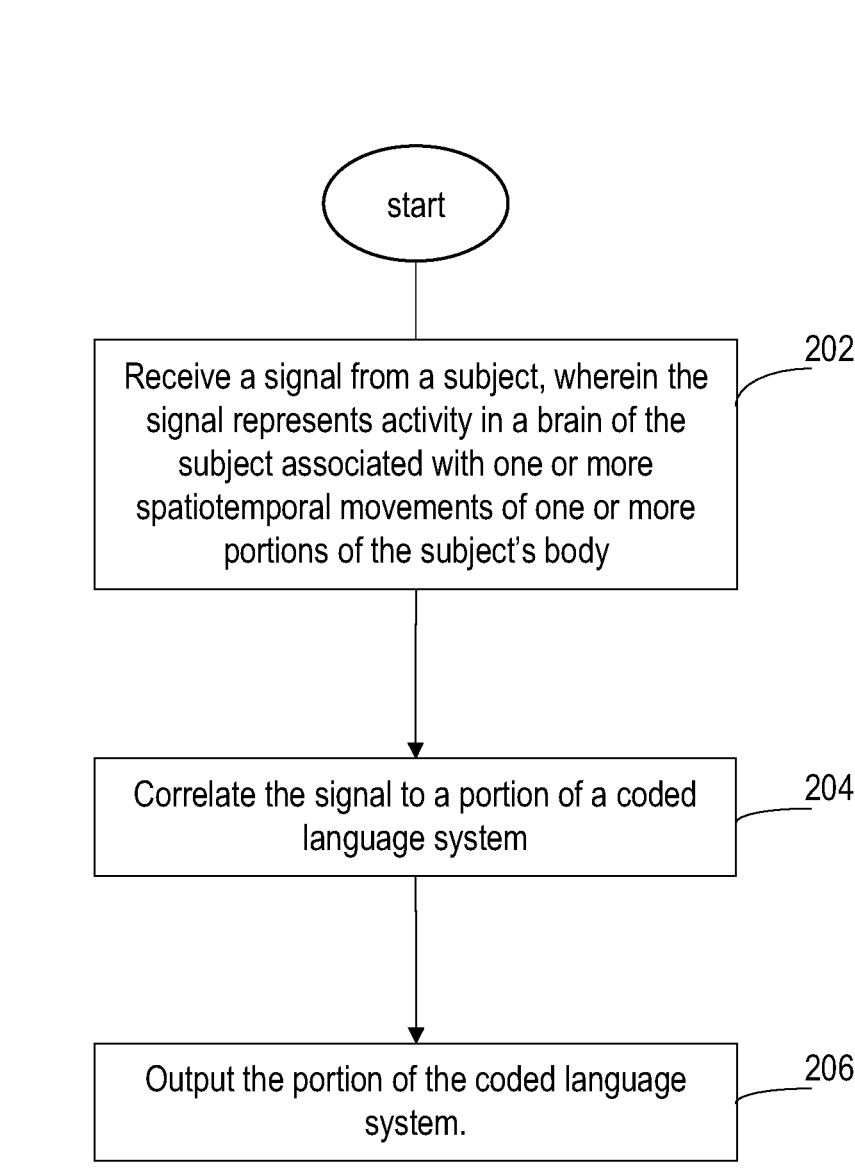
FIG. 2 depicts a block diagram of an illustrative method 200, in accordance with an exemplary embodiment of the present disclosure.

FIG. 2 depicts a flow chart illustrating an example method of communication 200, according to some embodiments of the present disclosure. In some embodiments, at 202, the method may include receiving a signal from a subject. Signals can come from inside or outside of a subject's body. In some embodiments, signals can include physical (e.g., touch, temperature, pressure) and/or electrical activity (e.g., nerve signals, electromagnetic signals, electrical impulses). Electrical activity can be detected, observed, and received from the brain, the heart, and the nervous system. Furthermore, signals can represent various different activities within a subject's brain, heart, and nervous system. Signals can include neuronal, electromagnetic, and/or electrical impulses. According to some embodiments, the signal can represent activity in the brain of a subject. Observable activity in the brain can be primarily electrical activity, such as brain waves or neural patterns, both of which can be associated with actions, attempted actions, and/or mental states (e.g., person's state of alertness, relaxation, anxiety, tiredness, etc.,).

Figure 3A:
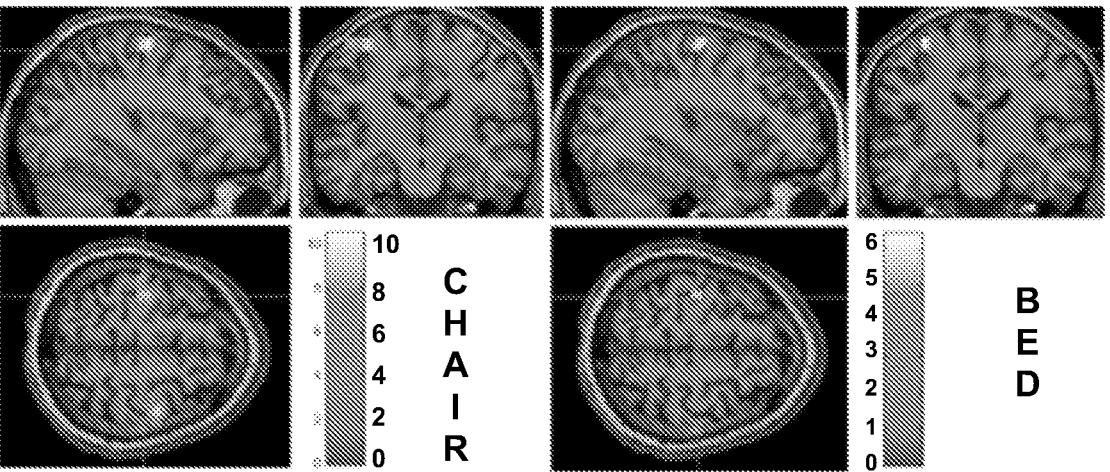
FIGS. 3A and 3B show functional magnetic resonance imaging (fMRI) and an example blood-oxygen level dependent (BOLD) signal.
Figure 6B:
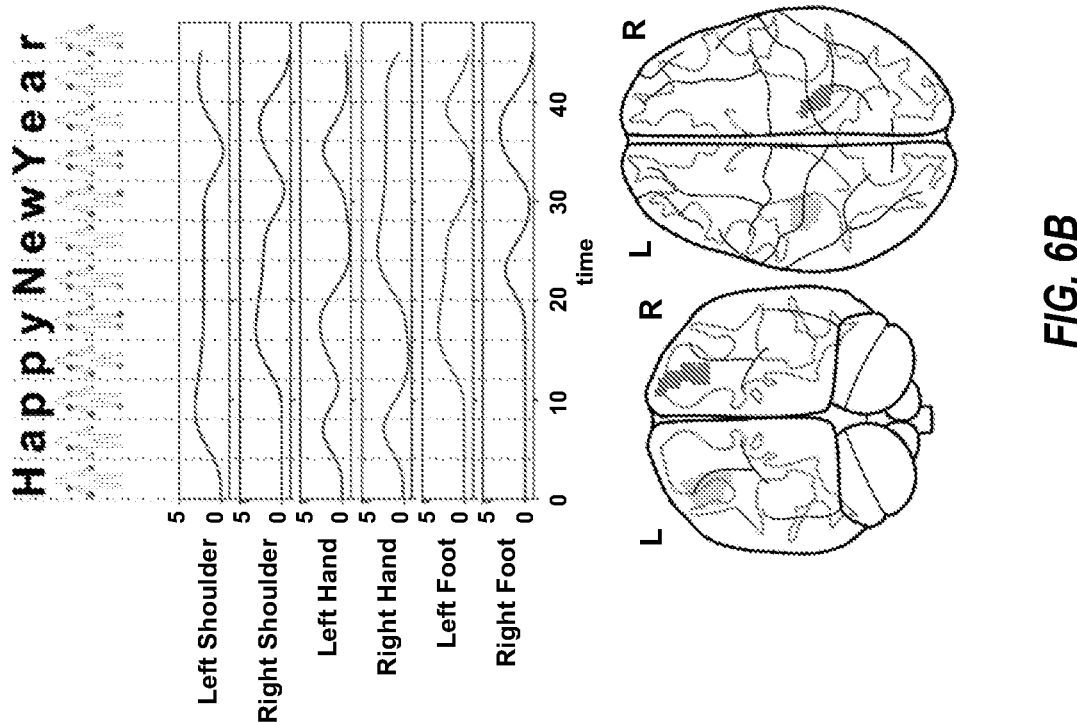
FIGS. 6A and 6B provide an example BOLD response (%) versus time (sec) of a subject executing, attempting, or imagining the actions for the letter sequence "Happy New Year" with an example re-designed Braille Dot alphabet mapped to different body parts, in accordance with an exemplary embodiment of the present disclosure.
Figure 6A:
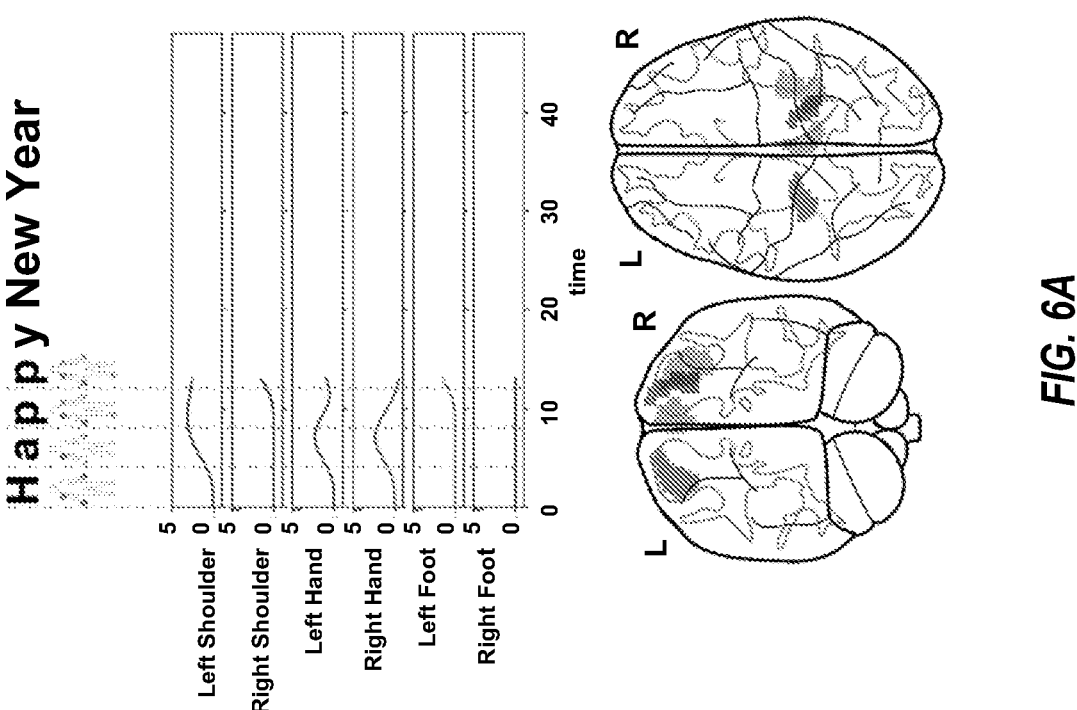

According to some embodiments, at 202, the signal can represent activity in the brain of a subject, where the signal can be associated with spatiotemporal movements of one or more portions of the subject's body. In some embodiments, one spatiotemporal movement can represent one signal, or a combination of spatiotemporal movements can represent one signal, for example, the movement of a subject's right shoulder may represent the letter "a," or the simultaneous combined movement of a subject's right shoulder, right hand, and left hand may represent the letter "h" (as shown in FIG. 6A). In some embodiments, however, one spatiotemporal movement can represent an entire word, phrase, or command, for example, the motion of "CHAIR" in sign language, may generate one signal (as shown in FIG. 3A). Spatiotemporal movements can be continuous movements made one sign at a time, such as sign language, as well as discrete or a combination of discrete movements made simultaneously, as demonstrated in FIG. 9.

In some embodiments, spatiotemporal movements can be executed actions, attempted actions, or imagined actions. Examples of executed actions include, but are not limited to, tightening, stretching, clenching, flexing, or otherwise moving a muscle, a tendon, a joint, an organ, a bone, skin, cartilage, or any combination thereof. Attempted actions can occur when a subject believes that an action can and will happen, such as, for example, movement of a phantom limb (i.e., a limb that has been removed but the brain still believes it is attached and functional). Imagined actions, imagined sensations, or mental tasks (e g, thinking or imagining movement), can be similar to attempted actions, but the subject may know that the action cannot occur, but they are imagining an action and/or sensation which results in the same extent of signal as executed actions, with regard to the tightening, stretching, clenching, flexing, or otherwise moving a muscle, a tendon, a joint, an organ, a bone, skin, cartilage, or any combination thereof. Importantly, brain signals from executed actions and imagined actions share, to some extent, the same neural or electrical activity, and a similar observability using the methods described herein (see A. Guillot, F. D. Rienzo, T. MacIntyre, A. Moran, and C. Collet. Imagining is Not Doing but Involves Specific Motor Commands: A Review of Experimental Data Related to Motor Inhibition. Front. Hum. Neurosci., 2012, 6, 247).

Spatiotemporal movements of a subject's body can result in distinguishable brain signals from the motor cortex. The motor cortex is the region of the cerebral cortex involved in the planning, control, and execution of voluntary movements. Different parts of the human brain are dedicated to processing motor functions and sensory functions for various parts of the body. Importantly, these different parts of the human brain can identify distinct motor and sensory functions involved in executed actions, attempted actions, and imagined actions. Examples of body parts that can result in distinct brain activity include, but are not limited to, the pharynx, tongue, teeth, gums, jaw, lips, face, nose, right eye, left eye, right thumb, left thumb, fingers of the right hand (e.g., index, middle, ring, and little fingers), fingers of the left hand, right hand, left hand, right wrist, left wrist, right forearm, left forearm, right elbow, left elbow, right arm, left arm, right shoulder, left shoulder, head, neck, trunk, right hip, left hip, right leg, left leg, right thigh, left thigh, right calf, left calf, right ankle, left ankle, right foot, left foot, toes of the left foot, toes of the right foot, genitals, and buttocks.

In some embodiments, signals of a specific region of the brain associated to a specific body part can be distinguished from signals from a different region of the brain associated to a different body part. For example, the brain signal for a subject's action involving the right shoulder may be distinguished from the brain signal for the subject's action involving the left hand.

In some embodiments, the brain signals can be detected by various neurophysiological methods, including, for example, magnetic methods, optical methods, infrared methods, electrical methods, and the like. Some techniques for detecting the brain signals can include portable and non-portable non-invasive systems having a receiver and/or a transceiver. Non-invasive systems having a receiver and/or a transceiver can include using functional magnetic resonance imaging (fMRI) systems, functional near infrared (fNIR) imaging systems, positron emission tomography (PET) imaging systems, electroencephalography (EEG) systems, magnetoencephalography (MEG) systems, fluorescence calcium imaging systems, single cell recording systems, electrocorticography (ECoG) systems, diffuse optical tomography (DOT), intrinsic optical signal (IOS) imaging, extrinsic optical signal (EOS) imaging, Doppler flowmetry (LDF), functional optical coherence tomography (fOCT), surface plasmon resonance (SPR), diffusion tensor imaging (DTI), manganese-enhanced MRI (ME-MRI), multiphoton microscopy (MP), brain-computer interface (BCI) systems, and the like. When combined with other neuroimaging techniques, transcranial magnetic stimulation (TMS) imaging can also be used to map behavior related circuitry with spatial and temporal precision.

In some embodiments, the brain signals can be detected using invasive systems, such as, for example, implanted electrodes, groups of electrodes, or multielectrode arrays. Such invasive systems can be implanted into a subject's brain, heart, or nervous system.

As shown in FIG. 3A, discernable brain regions can be mapped to corresponding executed actions, such as the act of signing the word "CHAIR" and "BED," as well as imagined actions of thinking of the items "CHAIR" and "BED." These actions, both executed and imagined, can be detected on the systems described above, and as shown in FIG. 3A, such as a fMRI. Additionally, the signal can identify and quantify specific regions of the brain correlated to a haemodynamic response, where blood releases oxygen to active neurons at a greater rate compared to inactive neurons. When a subject conducts an executed action, attempted action, or an imagined action, the change in relative levels of oxygenated blood and deoxygenated blood can be detected. The change in blood oxygenation levels, termed the Blood Oxygenation Level-Dependent (BOLD) response, can be measured for neural responses in whole brain mapping, as well as neural responses for specific regions of the brain. Brain activity based on cerebral blood flow (CBF), cerebral blood volume (CBV), oxygen extraction, and local metabolic rate can also be detected via BOLD response.

Functional MRI may non-invasively map a subject's motor cortex function without the use of contrast agents by relying on the BOLD response due to the ability of deoxyhemoglobin to act as an endogenous paramagnetic contrast agent because changes in the local concentration of deoxygenated blood within the brain can lead to alterations in the magnetic resonance signal. Functional NIR spectroscopy may non-invasively be transmitted through biological tissues over large distances and can be used to observe changes in oxygenated blood concentrations in the brain. Additionally, fNIR can generate a BOLD response with a temporal resolution comparable to that of fMRI, with the added benefits of lower cost, lack of restrictions on a subject's motions, and portability.

Figure 3B:
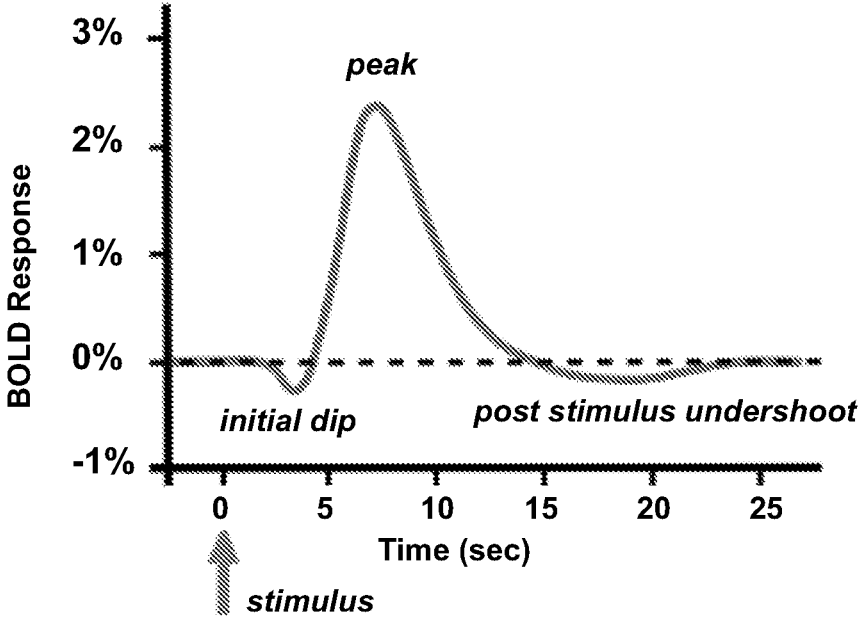

As shown in FIG. 3B, a BOLD response can be observed when a subject experiences a stimulation or conducts an executed action, attempted action, or imagined action (designated time=0 sec in FIG. 3B), such as, for example, a finger tapping, clench a fist, or imagining clenching a fist. The BOLD response shows an initial dip in the local oxygen concentration due to capillaries in the area of the stimulation supplying a surplus of oxygenated blood to "activate" the area of stimulation, leading to an increased signal to noise ratio and a positive BOLD response (designated as "peak"). Incidentally, after the stimulation has been removed or the conduct has stopped, continued oxygen consumption leads to a post response undershoot.

In some embodiments, the BOLD response of a specific region of the brain associated to a specific body part can be distinguished from the BOLD response from a different region of the brain associated to a different body part. For example, the BOLD response in the brain for a subject's action involving the right shoulder may be distinguished from the BOLD response in the brain for the subject's action involving the left hand.

According to some embodiments, the BOLD response for a stimulation, executed action, attempted action, or imagined action can be simultaneously observed for different regions of the brain, resulting in multiple simultaneous signals associated to a plurality of stimuli, executed actions, attempted actions, or imagined actions.

Because the motor cortex and sensory cortex are parallel to one another, a fMRI- or fNIR-BOLD response may be used to distinguish between a subject's motor cortex and sensory cortex. For example, the BOLD response for a stimulation of the right-hand by any sensory means (e.g., visual, auditory, tactile, and the like) can be compared to the BOLD response for an executed action, attempted action, or imagined action, such that the right-hand sensing region of the sensory cortex can be identified and/or distinguished from the right-hand motor control region of the subject's brain. In general, activating the sensing region of the sensory cortex can also reveal where respective motor control is for a particular part of a subject's body.

According to some embodiments, brain activity can also be mapped, observed, and/or received via optogenetics. Optogenetics uses light to control or observe neurons genetically modified to express light-sensitive ion channels. Light-sensitive proteins or small molecules can be rapidly and locally associated with spatial resolution on the order of single neurons and temporal resolution on the order of milliseconds. Voltage-sensitive dyes and calcium indicators may also be used to observe brain activity associated to spatiotemporal movements (e.g., executed, attempted, and/or imagined actions). In some embodiments, direct chemical sensing of oxygen or oxygen-sensitive proteins or small molecules can detect brain activity associated to spatiotemporal movements.

In some embodiments, the method, at 204, can also comprise a signal from the subject that can be correlated to a portion of a coded language system. As used herein, a coded language system can include any portion of a series of letters, symbols, words, phrases, and the like, used to communicate a message. Additionally, the coded language system can comprise a plurality of letters, words, phrases, expressions, and the like, such that individual portions of that coded language system, either alone or in combination with other portions, can be used to communicate a message. For example, a subject using a coded language system may indicate the phrase "I want to sit in my chair" by coding the letter "I" with one signal, the word "want" by coding a second signal, and the word "chair" by coding a third signal. Alternatively, with the same example above, a subject may use a coded language system to indicate using a single signal the phrase "I want to sit in my chair" by coding a single signal that has been coded to equal such a phrase.

In some embodiments, the coded language system of the method disclosed herein can comprise text (e.g., letters, words, phrases, and the like) associated to one or more chorded systems. Generally, in a chorded system, a key is mapped to a number and then mapped to a corresponding character (e.g., letter, word, and/or phrase). By pressing two or more keys together, the user can generate many combinations of letters, words, phrases, and the like. For example, the first chorded keyset used five keys mapped to the numbers 1, 2, 4, 8, and 16. The numbers where then mapped to letters a=1, b=2, d=4, h=8, and p=16, such that a combination of the five keys could spell out the alphabet and other characters. The chord is recognized only after all the keys are released. For example, a user could simultaneously press keys 2 and 4 and then release the keys to generate the letter "f," where f=6. A keyset using five keys could be used by a subject's single hand. As would be appreciated by those of skill in the art, a two-handed chorded text entry can be faster and yield fewer errors than a single-handed chorded text entry system.

Chorded systems can comprise any number of keys, buttons, or points that can generate a letter, word or phrase based on the combination of keys pressed at the same time. Examples of chorded systems include, but are not limited to, Morse Code (1 key), QWERTY (5 keys), Braille (6-9 keys), GKOS (6 keys), ASETNIOP (8 keys), Microwriter (9 keys), CyKey (9 keys), Decatxt (10 keys), EkaPad (12 keys), velotype (15 keys), Twiddler (16 keys), SiWriter (16 keys), FrogPad (20 keys), stenotype (22 keys), or combinations thereof.

Figure 4A:
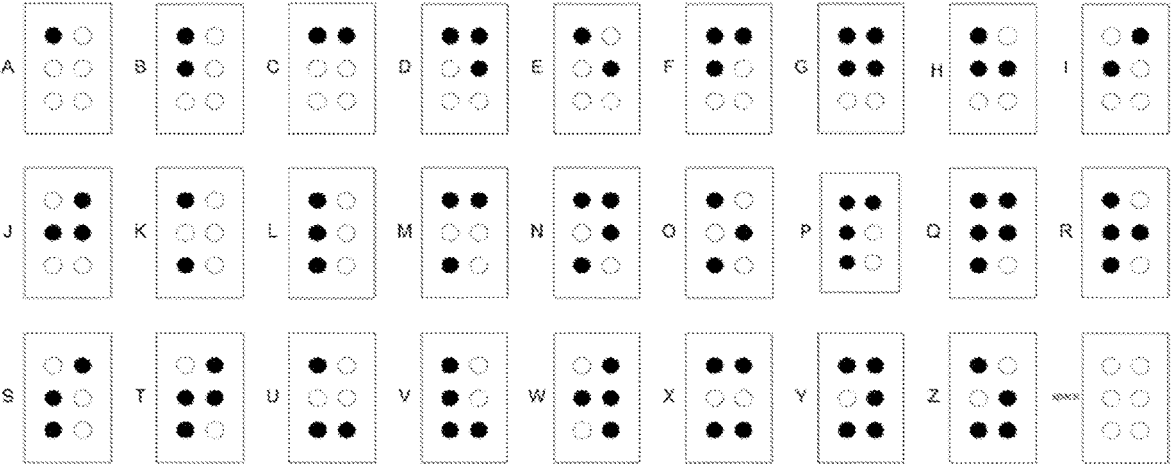
FIGS. 4A and 4B provide a Braille dot alphabet.
Figure 4B:
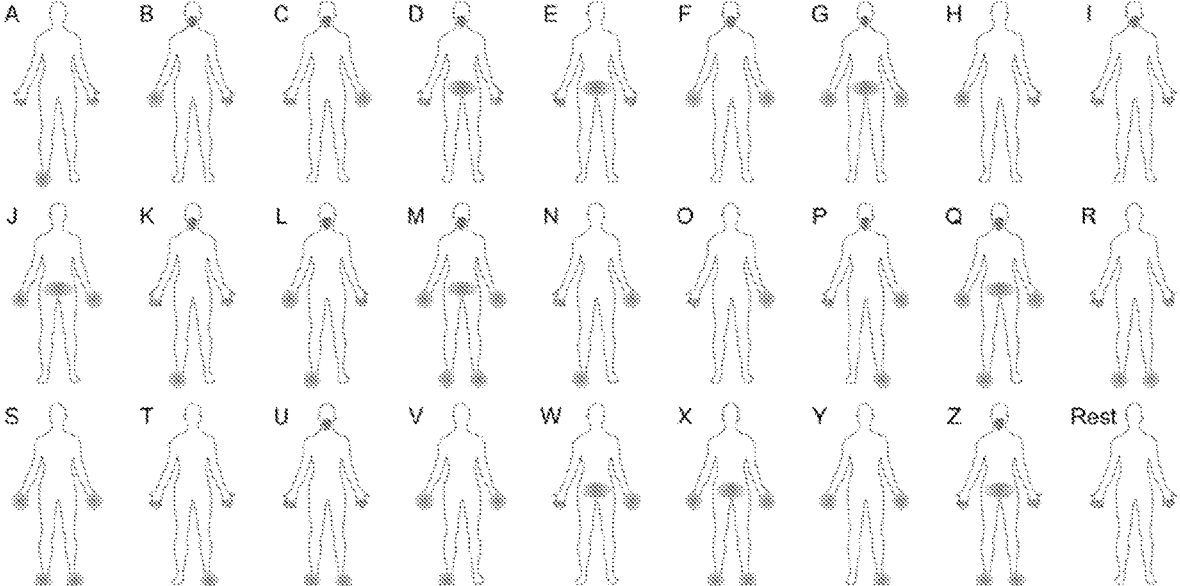

In some embodiments, the chorded system of the present disclosure can comprise mapping keys, not to a keyset or keyboard, but to one or more points on a subject's body. For example, as shown in FIGS. 4A and 4B, the present disclosure can provide the Braille chorded system mapped to one or more points on a subject's body, where the six Braille dots in two columns of three dots can be mapped on a subject, for instance, on the subject's shoulders, hands, and feet. In some embodiments, a single point on a subject's body can represent one letter, word, phrase, or symbol. For example, a portion of the subject's right foot may represent "A." As further depicted in FIG. 4B, combination of points on a subject's body can represent one letter, word, phrase, or symbol, such as, for example, the combination of the subject's right foot with the subject's left hand may represent "L."

Figure 5:
FIG. 5 shows an exemplary depiction of several body parts and their respective general location within the motor cortex of the cerebral cortex, in accordance with an exemplary embodiment of the present disclosure.
Figure 5:
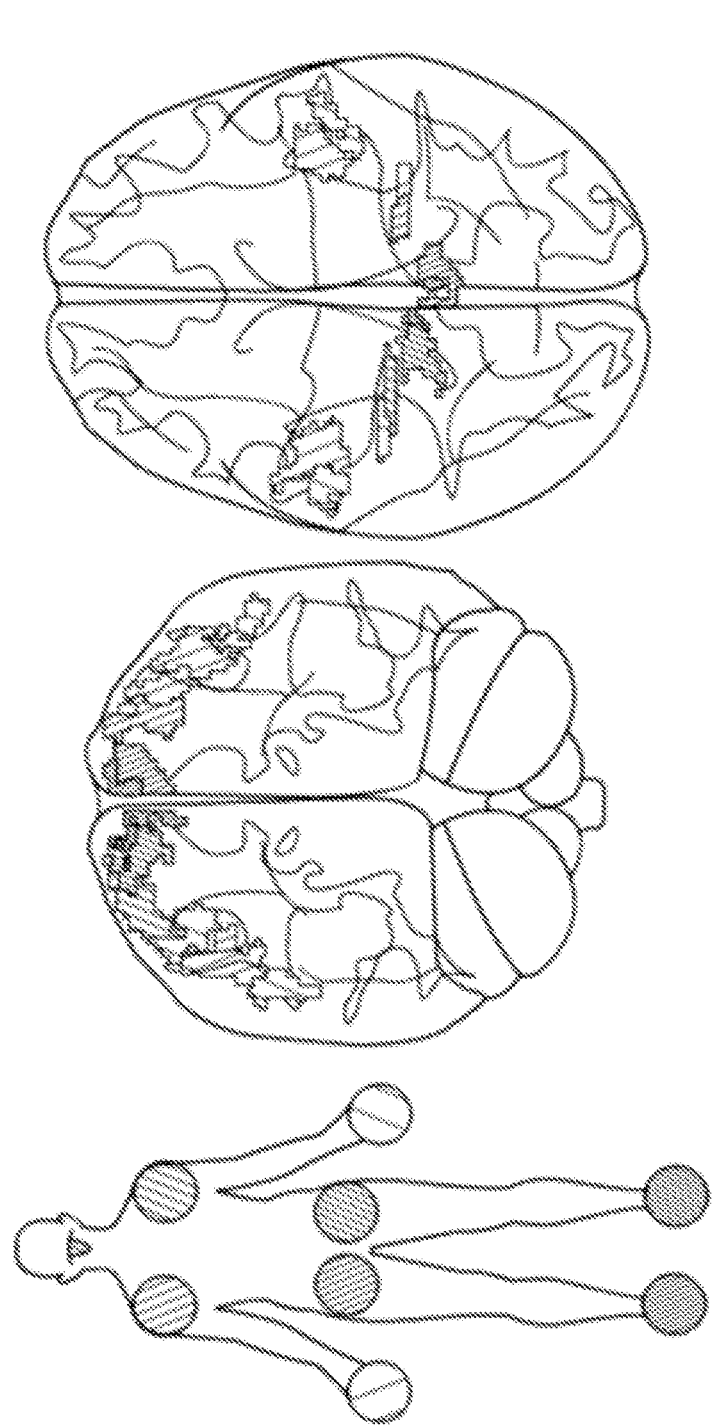

In some embodiments, the chorded system of the present disclosure can comprise 26-points such that the chorded system has a point mapped on the subject's body for each letter of the alphabet. In some embodiments, the chorded system can comprise less than 26-points, (e.g., 24 points or less, 22 points or less, 20 points or less, 18 points or less, 16 points or less, 14 points or less, 12 points or less, 10 points or less, 8 points or less, 6 points or less, 4 points or less, 2 points or less, 1 point, or any number of points within these ranges). For example, a chorded system having nine points, similar to the Braille chorded system, can be mapped to one or more points on a subject's body. As shown in FIG. 4B or FIG. 5, nine points in two columns of three dots, with one dot at the top, where the tongue is, can be mapped on a subject, for example, on the subject's shoulders, hands, buttocks, and feet.

As would be appreciated, any chorded system having at least 5 keys is sufficient to have enough combinations of two keys to make the alphabet (e.g., $2^5=32$ combinations). Chorded systems having between 1 and 4 keys can create combinations using two or more keys at one time to make the alphabet. In some embodiments, keys can be encoded through a time-based chorded system, such as Morse code. For example, a subject could conduct an executed or imagined action, such as tensing a muscle, for a longer duration of time to create a dash (e.g., tense a muscle for 6 seconds) and for a shorter duration of time to create a dot (e.g., tense a muscle for 2 seconds). As could be appreciated, a chorded system having only one key, or one point on a subject's body, can be used in this way to communicate a message, although more keys and/or points on a subject's body would result in faster communication.

In some embodiments, the chorded system can be mapped to only two points on a subject's body. For instance, the right hand can be a first point and the left hand can be a second point. In certain embodiments, each point can be labelled with classifications of "inactive" when the body part is in a relaxed state, and "active" when the body part is in an active state (i.e., with executed actions, attempted actions, or imagined actions). The labels of the classifications can have the following transitions: inactive-inactive(00), inactive-active(01), active-active(11), and active-inactive(10), where "inactive"=0 and "active"=1. Such a classification of two points can be used to generate a binary, or base-2 numeric system that can be used in connection with a computer system. In some embodiments, a single binary digit can represent "True" (1) or "False" (0) and could be used in boolean logic. In some embodiments, multiple binary digits can be used to represent large numbers and perform complex functions.

As would be appreciated, the coded language system mapped to a subject's body can be tailored to a chorded system that fits the subject's physical needs. For example, a subject with complete control of their hands may use a chorded system mapped to different fingers of the subject such that spatiotemporal movements of one or more fingers may generate a message tied to the brain signals associated to each movement or combination of movements of the subject's finger(s). As another example, for a subject with no control of their body, such as a subject in the "locked-in" state of ALS, the subject may use a chorded system mapped to different portions of the subject's body such that one or more executed actions, attempted actions, or imagined actions of the subject's body (e.g., left foot in combination with the right hand) may generate a message tied to the brain signals associated to each movement or combination of movements of the subject's body. Further, the coded language system may be tailored specifically to the subject such that text (letters, words, phrases, symbols) may not be associated to a known chorded system. Instead, the coded language system can map emotions or feelings to the subject's body that may assist the subject's care providers in assisting the subject.

FIG. 5 depicts several exemplary body parts that can be used to generate a chorded system, and their respective general location within the motor cortex of the cerebral cortex. Accordingly, discernable brain regions can be mapped to corresponding executed actions, attempted actions, and/or imagined actions of different body parts.

In some embodiments, the brain signal from a subject may be associated to a chorded system when the subject initially performs the executed action, attempted action, or imagined action. Alternatively, the brain signal from a subject may be associated to a chorded system when the subject releases the executed action, attempted action, or imagined action. In some embodiments, the brain signal may be best identified when a subject conducts the executed, attempted, or imagined action and holds the action for a length of time, such as, for example from about 1 second to about 2 seconds (e.g., from about 1 second to about 3 seconds, from about 1 second to about 4 seconds, from about 1 second to about 5 seconds, from about 1 second to about 6 seconds, from about 1 second to about 7 seconds, from about 1 second to about 8 seconds, from about 1 second to about 9 seconds, from about 1 second to about 10 seconds, or any range within these values, e.g., 3 seconds to 8 seconds). In some embodiments, the brain signal from a subject can be best identified several seconds after the subject conducts the executed or imagined action. In such a case, the subject may release the first executed, attempted, or imagined action and wait for a length of time before conducting a second action. As would be appreciated by those of skill in the art, such length of time may vary depending on the method used to receive the brain signal. In some embodiments, the length of time between executed or imagined actions can range from about 0.5 seconds to 1.5 seconds (e.g., from about 0.5 seconds to about 2 seconds, from about 0.5 seconds to about 2.5 seconds, from about 0.5 seconds to about 3 seconds, from about 0.5 seconds to about 3.5 seconds, from about 0.5 seconds to about 3.5 seconds, from about 0.5 seconds to about 4 seconds, from about 0.5 seconds to about 4.5 seconds, from about 0.5 seconds to about 5 seconds, or any range within these values, e.g., 2.5 seconds to 4.5 seconds), although shorter ranges are contemplated, and may be available from improved brain signal receiving devices or implanted electrode systems.

As would be appreciated by those of skill in the relevant art, composing a coded language that comprises differentiated text can be accomplished by optimizing the speed of the executed, attempted, and/or imagined actions and any rest periods according to the receiving device used. In some embodiments, text characters (e.g., letters, words, phrases, computer commands, etc.,) can be distinguished using specified 6 second intervals between each executed, attempted, and/or imagined actions. In some embodiments, the text characters can be distinguished using less than about 6 second intervals (e.g., from about 6 seconds to about 5.5 seconds, from about 5.5 seconds to about 5 seconds, from about 5 seconds to about 4.5 seconds, from about 4.5 seconds to about 4 seconds, from about 4 seconds to about 3.5 seconds, from about 3.5 seconds to about 2 seconds, from about 2 seconds to about 1.5 seconds, from about 1.5 seconds to about 1 seconds, from about 1 second to about 0.5 seconds, from about 0.5 seconds to about 0.3 seconds, from about 0.3 seconds to about 0.1 seconds, or any range within these values, e.g., 5.2 seconds to 1.7 seconds). As would be appreciated, the optimization scheme for disambiguation can vary per subject and per receiving device used.

According to some embodiments, a subject may signal, using one or more spatiotemporal movements (e.g., executed or imagined actions) correlated to the coded language system as described above. Additionally, a subject may signal a series of texts correlated to the coded language system as depicted in FIGS. 6A and 6B, where a series of signals from a subject's one or more spatiotemporal movements generates the phrase "Happy New Year" through a series of executed, attempted, and/or imagined actions detected within specific regions of the subject's brain.

Figure 7:
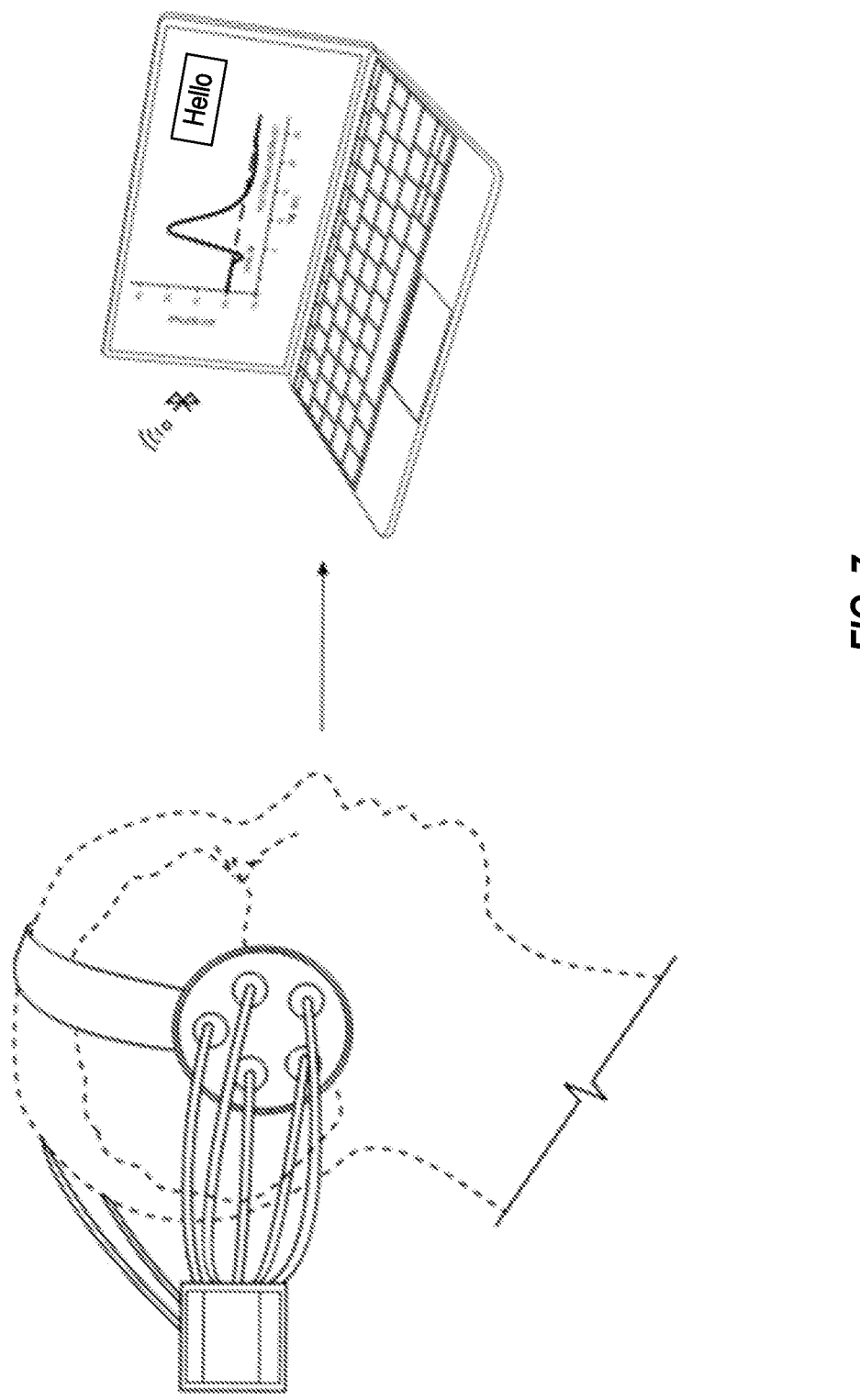
FIG. 7 provides a non-invasive brain computer interface (BCI), in accordance with an exemplary embodiment of the present disclosure.

As shown in FIG. 7, the method, at 206, can also comprise outputting the portion of the coded language system, based on a signal from a subject's one or more spatiotemporal movements. In some embodiments, outputting can include, but is not limited to, displaying on a screen (e.g., a monitor, a mobile device, a portable device, a speech-generating device), generating an audio signal, generating a text message, generating a tactile message, generating a picture or animated image (e.g., a gif, a photo, a text to image, an emoji), or combinations thereof. In some embodiments, the output message can be a command to a computer or processor to perform one or more actions, such as, for example, the message of "turn on the lights" can be converted into electrical signals that control the power to a light switch.

In some embodiments, a controller may be configured to correlate the signal to a portion of a coded language system and output the portion of the coded language system into a format such as text or speech. As used herein, a controller can be any processor, microprocessor, or controller known in the art. The controller can comprise a memory and processor, the memory can comprise instructions that, when executed by the processor, cause the controller to correlate the signal from the subject to a portion of the coded language system. In some embodiments, the controller may output the coded language system by displaying the message on a screen (e.g., a monitor, a mobile device, a portable device, a speech-generating device), generating the message into an audio signal, generating the message into a text message, generating a tactile message, generating a picture or animated image (e.g., a gif, a photo, a text to image, an emoji), or combinations thereof, although other forms of outputting a message are contemplated.

According to some embodiments, the method can also comprise demonstrating to the subject the one or more spatiotemporal movements associated with the portion of the coded language system. The systems, methods, and computer readable media (CRM) disclosed herein can demonstrate or convey one or more coded language systems in a variety of ways. The coded language system can be demonstrated or conveyed through any sensory perception, including sight, sound, touch, smell, taste, or a combination thereof. For example, the coded language system can be verbally explained to a subject, visually shown to a subject, physically enacted on a subject, or any other means available to provide instructions to a subject.

In some embodiments, demonstrating can be conveyed through one or more tactile stimuli, such as for example, tap input, audio input, bone conduction, electrical input, vibrational input, visual input, gesture input, text input, magnetic stimulation, or a combination thereof. Electrical tactile stimulation can comprise electrical muscle stimulation, transcutaneous electrical nerve stimulation, functional electrical stimulation, neuromuscular electrical stimulation, and Russian electrical stimulation (i.e., a form of functional electric stimulation that uses frequencies in the range of 2400 to 2500 Hz to improve strength of muscles). In some embodiments, the coded language system is conveyed haptically (actively and/or passively). The conveyance can include teaching, learning, or a combination thereof.

Learning is not always an active process; it can sometimes be passive. Passive learning is "caught, rather than taught," and is characterized as "typically effortless, responsive to animated stimuli, amenable to artificial aid to relaxation, and characterized by an absence of resistance to what is learned." For instance, subjects who live in a media rich environment and are passively exposed to political information are 40% more likely to acquire the information than subjects living in a media poor environment. A media-rich environment need not be limited to audio and visual stimulation though. It has been shown that a multi-modal combination of audio and haptic cues gives users a richer understanding of musical structure and improves performance on music pieces, for example, see U.S. Pat. No. 10,121,388 B2. Manual skills can be learned or reinforced passively using tactile stimulation while the user is engaged in other tasks.

In some embodiments, the systems and methods disclosed herein can be used to teach words, letters, phrases, symbols, or combinations thereof to facilitate language-related learning of a chorded system (including, for instance, chorded systems mapped onto one or more portions of the subject's body). In certain embodiments, the systems and methods can be used to facilitate the communication in a particularized chorded system, such as Braille or stenography. In some embodiments, the manual or passive tactile stimulate can be conveyed to teach one or more chorded systems. Communication via one or more chorded systems can be taught, in some embodiments, via incremental use with a pangram.

In some embodiments, the language-related learning involves newly learning a chorded system or a portion thereof. In some embodiments, the language-related learning involves enhancing and/or advancing skills related to an already-learned chorded system (e.g., enhancing speed of writing a message; increased number or volume of words, letters, and/or phrases learned and/or conducted by executed, attempted, and/or imagined actions). Examples of chorded systems include, but are not limited to, Morse Code (1 key), QWERTY (5 keys), Braille (6-9 keys), GKOS (6 keys), ASETNIOP (8 keys), Microwriter (9 keys), CyKey (9 keys), Decatxt (10 keys), EkaPad (12 keys), velotype (15 keys), Twiddler (16 keys), SiWriter (16 keys), FrogPad (20 keys), stenotype (22 keys), or combinations thereof. In some embodiments, the chorded system can be taught via tap input for text entry on, for instance, a mobile device. In some embodiments, the chorded system can be taught using only audio (which may result in passive learning of text entry).

In some embodiments, the chorded systems may involve rhythm and/or temporally based systems, such as Morse code. In some embodiments, the Morse code learning involves newly learning Morse code or portion thereof. In some embodiments, the Morse code learning involves enhancing and/or advancing skills related to an already-learned code (e.g., enhancing speed of writing a message; increased number or volume of words, letters, and/or phrases learned and/or conducted by executed, attempted, and/or imagined actions). In some embodiments, the Morse code is taught via tap input for text entry on, for instance, a mobile device. In some embodiments, Morse code is taught using only audio (which may result in passive learning of text entry).

In some embodiments, the language-related learning involves newly learning a chorded system or a portion thereof that is mapped to a subject's body, such that a key of the chorded system is associated to a point on a subject's body. As described above, learning a chorded system can be conveyed through one or more tactile stimuli such as for example, tap input, audio input, bone conduction, electrical input, vibrational input, visual input, gesture input, text input, magnetic stimulation, or a combination thereof. Accordingly, learning of a chorded system mapped to a subject's body could include providing tactile stimuli to one or more parts of a subject's body, either through manual stimulation (e.g., by another person, a clinician, a therapist, etc.) or through automated stimulation (e.g., by a device).

As shown in FIGS. 8A-8D, a plurality of actuators can be positioned on or within a wearable device configured to be in contact with one or more parts of a subject's body. In some embodiments, the plurality of actuators can be associated the one or more parts of the subject's body that are correlated to the chorded system points. In some embodiments, each of the plurality of actuators can include a vibration motor, an electrode, a skin stretch, a speaker, a bone-conduction device, or a combination thereof.

In some embodiments, the method and systems described herein can further include demonstrating to the subject one or more describing indications before executing the first stimulation sequence to the subject. The one or more describing indications can give the subject context about an upcoming sequence. According to some embodiments, the one or more describing indications may be a visual cue, an audible sound, a pause, a vibration, an electric shock, or any combination thereof. In some embodiments the describing indication may be an indication of the idea embodied by the chorded input. For example, in some embodiments the describing indication may represent a letter of the alphabet. Thus, in some embodiments a describing indication may be a sound played by a speaker indicating a letter of the alphabet. In some embodiments the describing device may be a speaker, a display, a screen, or a wearable headset configured for display of a visual cue.

According to some embodiments, the stimuli caused by a given actuator's stimulation sequence may be temporally separated by a predetermined offset. For example, a first stimulation and a second stimulation in a plurality of stimuli may be separated by a predetermined offset, which could be from 0 milliseconds to 50 milliseconds (e.g., from 0-5 ms, from 5-10 ms, from 10-15 ms, from 15-20 ms, from 20-25 ms, from 25-30 ms, from 30-35 ms, from 35-40 ms, from 40-45 ms, from 45-50 ms, or from any range within these values, e.g., 18-26 ms). It will be understood by those of skill in the art that there may be more than one predetermined offset, or the value of the predetermined offset may change in different embodiments.

Additionally, in some embodiments, the execution of a subsequent stimulation sequence can begin a predetermined time after a plurality of stimuli ends. In some embodiments, the predetermined time is from 100 ms to 1 s (e.g., 100-200 ms, 200-300 ms, 300-400 ms, 400-500 ms, 500-600 ms, 600-700 ms, 700-800 ms, 800-900 ms, 900 ms-1 s, or from any range within these values, e.g., 150-350 ms).

According to some embodiments, the method may execute any number of stimulation sequences to one or more body parts, wherein each sequence represents a particular chord, which can be correlated to a letter, word, phrase, symbol, or any combination thereof. According to some embodiments, the method may automatically repeat a set of stimulation sequences, generating the resulting stimulation events over and over again, any number of times. As such, the method can serve to convey one or more chorded inputs via passive haptic learning.

In some embodiments, sequential tactile stimuli may alternate between body parts (e.g., left hand to right foot), even within a chorded action, according to a pre-programmed pattern based upon clarity determination. In some embodiments, stimuli within a chord traversing both hands are presented sequentially with temporal offset. In some embodiments, stimuli within a chord traversing two or more body parts grouped (in order) by the body part (e.g., if >2 stimuli per body part). In some embodiments, stimuli within a chord traversing two or more body parts starts with one body part containing the most stimuli (=executed, attempted, and/or imagined actions) in the chord. In some embodiments, stimuli within a chord traversing two or more body parts are conveyed by alternating body parts (e.g., if <2 stimuli per body part). In some embodiments, stimuli within a chord traversing two or more body parts are conveyed by grouping adjacent stimuli (stimuli that are on a body part having a chiral or an opposite body part), when the corresponding body part on the opposite side of the body are not stimulated in the chord (left foot not the right foot, left hand not the right hand, etc.,). In some embodiments, stimuli within a chord traversing both body parts having a chiral or an opposite body part are conveyed by alternating between the body parts, when the corresponding body part on the opposite side of the body is also in the chord (left foot and the right foot, left buttocks and right buttocks, etc.,). In some embodiments, this is done over the entire chorded sequence. In some embodiments, this is done over only a portion of the chorded sequence.

Also disclosed herein are methods for teaching manual tasks as described in the preceding paragraph, wherein audio accompanies tactile stimuli. In some embodiments, patterns and sequences (tactile) used for teaching are partitioned into chunks of from around 10 and around 18 tactile stimuli. In some embodiments, the method of teaching manual tasks is structured with synchronized audio that is used to encode meaning to the tactile patterns presented immediately before each chord-group of tactile stimuli for multiple simultaneous actions (e.g., vocalized "g" preceding the four stimuli to encode the Braille letter g). In some embodiments, the method of teaching manual tasks is structured with synchronized audio that is presented immediately before sections of sequential-action stimuli (e.g., words). In some embodiments, the method of teaching manual tasks is structured with synchronized audio that is presented preceding larger groups of stimuli (e.g., words, phrases).

According to another example embodiment, a computer program product is provided. The computer program product can include a computer-readable medium. The computer-readable medium may store instructions that, when executed by at least one processor of a system, causes the system to perform a method. In some embodiments disclosed herein is a non-transitory computer-readable medium that stores instructions that, when executed by at least one processor, causes the at least one processor to perform a method comprising receiving a signal from a subject. The signal can represent activity in the brain, heart, or nervous system of the subject. The signal can be associated to one or more spatiotemporal movements of one or more portions of the subject's body. The at least one processor can also correlate the signal to a portion of a coded language system and output the portion of the portion of the coded language system. The computer program product may also store instructions, that when executed by at least one processor, causes the at least one processor to perform a method comprising demonstrating, by a processor in electrical communication with a plurality of actuators and an output device, one or more stimulation sequences, each stimulation sequence comprising instructions for activating the plurality of actuators in a particular sequential order. The stimulation sequences from the plurality of actuators may demonstrate to the subject the one or more spatiotemporal movements associated with the portion of the coded language system. Responsive to executing a first stimulation sequence, the at least one processor may generate a second plurality of stimulation sequences configured to cause the plurality of actuators to activate in a second sequential order. Any number of stimulation sequences can be generated to cause the plurality of actuators to stimulate the subject in order to correlate the one or more spatiotemporal movements with the portion of the coded language system.

In some embodiments, the systems and methods disclosed herein can be used to facilitate communication. For instance, a "locked-in" subject suffering from ALS may be able to communicate by using attempted and imagined actions correlated to letters that can be observed and converted into text or speech by the methods and systems described herein.

According to some embodiments, the systems and methods disclosed herein can be used to facilitate mapping and/or calibration of the motor cortex for individuals. For example, a subject's sensory perception to stimuli results in a brain signal closely related to the motor cortex. When a subject experiences one or more stimuli to a particular part of the body, the stimulation can help determine which part of the motor cortex will respond to each attempted or imagined action and generate individualized mapping of a subject's motor cortex. Determining the brain region associated with a stimulation and/or spatiotemporal movement can result in calibration of the methods and systems described herein.

According to some embodiments, the systems and methods disclosed herein can be used to facilitate screening for invasive brain-computer interfaces. For instance, a subject can be screened for compatibility for implantation of an invasive receiver (e.g., implanted electrode, array or electrodes, or a group of electrodes) using this non-invasive method to determine whether a subject can sense stimulation and/or generate attempted and/or imagined actions.

According to some embodiments, the systems and methods disclosed herein can be used to facilitate rehabilitation. For example, the rehabilitation can include motor skill rehabilitation related to injury, disability, birth defect, aging, or combination thereof. In some embodiments, the rehabilitation includes increasing sensory perception to individuals suffering from paralysis.

In some embodiments, the systems, methods, and apparatuses disclosed herein can be used in any application using a haptic interface, which includes, but is not limited to, teleoperation, flight simulation, simulated training, dance, simulated combat, gaming controllers, gaming add-ons for augmented reality, computer-based learning systems, and text-entry systems. In some embodiments, muscle memory is taught via conveyance of a chorded system. In some embodiments, machine and/or system control is taught via conveyance of chorded system.

In some embodiments, the conveyance incorporates use of a wearable device. The wearable device can include, in some embodiments, a glove system including one or more gloves. In some embodiments, the wearable device can include a smart phone, a smart watch, a mobile phone, a computer, an electrostimulation unit, a wearable fitness unit (e.g., FITBIT®, JAWBONE®UP), a visual aid accessory (e.g., GOGGLE® GLASS), or any device attachable to various portions of a subject's body (examples shown in FIGS. 8A-8C).

While certain embodiments of the disclosed technology have been described in connection with what is presently considered to be the most practical embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

The following examples further illustrate aspects of the present disclosure. However, they are in no way a limitation of the teachings or disclosure of the present disclosure as set forth herein.

EXAMPLES

Example 1: Training Patients the Braille Chorded System

There are nearly 2,000,000 people in the United States who suffer from severe motor disabilities that render them incapable of communicating with the outside world. Even though these people may have complete paralysis, they can still imagine (i.e., attempt) motor movement, and the associated brain signals can be used to implement an effective brain-computer interface (BCI).

BrainBraille enables silent communication with functional Magnetic Resonance Imaging (fMRI) at relatively high rates of speed. Though non-invasive BCI rates have been reported up to 144 bits/minute and 21 characters/minute, most require intense visual attention. BrainBraille is more akin to typing and can be used by those who have low vision or who wish to communicate while looking at their conversational partner. Users of the BrainBraille system tense muscles in the two hands, two feet, tongue, and gluteus maximus to activate six regions of the motor cortex, which can be detected by a fMRI 20 times a minute. These six regions correspond to the six dots in a Braille cell, which represent letters. Contributions of BrainBraille include demonstrating a BCI that can achieve 95% accuracy on typing at 20 characters/minute, identifying and using multiple regions of the brain to overcome the slowness of the BOLD response, enabling better recognition by leveraging transitions between letters as they (literally) bleed into each other, describing how Passive Haptic Learning can teach BrainBraille to potential users with little effort, and detailing a method that may double reported typing rates. Rao et al., suggests that it is possible to resolve individual motor movements with spatially-proximate neural activation if their occurrence is separated by four seconds (see S. M. Rao, P. A. Bandettini, J. R. Binder, J. A. Bobholz, T. A. Hammeke E. A. Stein, and J. S. Hyde, "Relationship between finger movement rate and functional magnetic resonance signal change in human primary motor cortex", Journal of Cerebral Blood Flow & Metab., vol. 16, 1996). Lotze et al. and Meier et al. investigated somatotopic representation in human primary motor cortex and show the feasibility of recognizing somatotopic activation through fMRI. (see Lotze M, Erb M, Flor H, Huelsmann E, Godde B, Grodd W. fMRI evaluation of somatotopic representation in human primary motor cortex. Neuroimage. 2000 May 1; 11(5):473-81; see also Meier J D, Aflalo T N, Kastner S, Graziano M S. Complex organization of human primary motor cortex: a high-resolution fMRI study. Journal of neurophysiology. 2008 October; 100(4):1800-12). Mehta et al. demonstrate the detection of motor-based natural language in the brain using imagined American Sign Language (ASL) (see N. A. Mehta, T. Starner, M. M. Jackson, K. O. Babalola and G. A. James, "Recognizing Sign Language from Brain Imaging", 2010 20th International Conference on Pattern Recognition, Istanbul, 2010, pp. 3842-3845). However, ASL is complex to learn and requires a vast variety of motions. BrainBraille uses a more discrete language system, enabling users to learn the signals faster and to represent more information with fewer motions.

The Braille alphabet (FIG. 4A), is a tactile representation of language for individuals who have visual impairments. Each Braille cell contains two columns of three dots, and each character is represented by which of these six dots are raised. Grade Three Braille leverages the extra expressive power of a Braille cell to contract words into fewer cells, which could improve BrainBraille's speed.

One barrier, however, is learning the mapping of attempted body movements to letters. Fortunately, Seim et al. have shown that Passive Haptic Learning can be used to teach Braille in as little as four hours through vibrating motors that stimulate the fingers for each dot while the letters are spoken. Little to no attention is required. We hypothesize locked-in users who retain sensation (most ALS patients) might be fitted with a Passive Haptic Learning (PHL) system for BrainBraille such that they can learn the texting system "in the background." Seim has also shown that stimulating the limbs of stroke patients in this manner can lead to improvement in sensation and dexterity, which may have an extra benefit for locked-in BrainBraille learners.

Throughout the design and evaluation process of the BrainBraille system, we conduct all our experiments on one of the authors, a healthy, right-handed, 49-year old male. Several pilot studies are conducted to determine the optimal BrainBraille dot body parts from the candidate regions as shown in FIG. 5. Next, using a naive mapping of body parts to Braille dots, we proceeded to validate the BrainBraille system by characterizing the Blood Oxygenation Level-Dependent (BOLD) response curve for each individual dot and attempted to do classification on individual letters where we assumed the BOLD curve from adjacent letters do not affect each other. Then, based on the experiment results, we redesigned the BrainBraille dot layout to be easier to perform. Finally, over several experiments, we increased the frequency of letter input.

Example 2: Experimental Procedure

All of the fMRI data used in our experiments were acquired on a 3T Siemens Prisma-Fit MRI (Erlangen, Germany) equipped with a 32 channel receive-only head coil at the GSU/GT Center for Advanced Brain Imaging, Atlanta. Each 1-2 hour long imaging session included the following scans: 1) 3-plane localizer; 2) 1-weighted 3D-MPRAGE structural scan: Field-of-View (FOV)=256 mm, 176 slices, 1 mm$^3$ isotropic voxels, repetition time (TR)=2250 ms, echo time (TE)=3.98 ms, inversion time (TI) 850 ms, flip angle (FA) 9°; 3) BOLD-fMRI (varies in different experiments): 35-51 slices, TR=500-1500 ms, TE=32 ms, FA=46-60°, FOV=216 mm, Matrix-size=108×108, in-plane resolution=2×2 mm$^2$, slice-thickness=2 mm, gap=0 mm, GRAPPA=2. For each fMRI experiment, visual cues depicting different combinations of highlighted body parts were presented to the subject, who performed the appropriate action while inside the scanner. BOLD-fMRI images were acquired simultaneously during this time (FIGS. 6A, 6B, 9 and 10). In each experiment, there were 8-10 fMRI runs. The visual cues were presented using a PC running E-Prime 3 (www.pstnet.com) connected to an MRI compatible projector (SV-6060, www.avotecinc.com). The visual cue images were back-projected on to a MRI-compatible screen and were viewed by the subject using a mirror mounted on top of the head coil. The visual cues were presented in a fixed-interval event-related design. Upon viewing the visual cue image, the subject performs an isometric tensing of the muscles in the corresponding body parts highlighted in the image until the next cue appears. The subject practiced performing the prepared visual cues for a few days before each experiment in order to become familiar with the movements. The subject was given 1-2 minutes of rest between runs.

All fMRI experiment data were pre-processed prior to the timeseries analysis using BROCCOLI, a graphics processing unit (GPU) accelerated fMRI processing library. For each session's data, BROCCOLI was used to perform motion correction, smoothing (6 mm FWHM) and normalization/registration to standard space template.

Example 3: Identifying Region of Interest (ROI) of Each Braille Chorded System Point Using BROCCOLI, we performed a voxel-wise timeseries regression analysis using a generalized linear model (GLM). A regressor corresponding to each individual BrainBraille body part pattern was specified in the model. Activation maps or t-score maps were computed corresponding to each BrainBraille pattern. To save computation time and ensure voxels selected are responsible for the motion, and not other brain activity, the only voxels considered are those in the motor cortex which are specified by the primary motor cortex BA4a in Juelich probability atlas. For each BrainBraille dot/point, voxels that have a t-score above the 0.995 quantile of all positive t-scores are considered as the Region of Interest (ROI). After extracting the ROI for each of the six dots, overlapping volumes among different dot volumes are excluded from all. To simplify the time series analysis and letter recognition, the spatial average value of each ROI is then taken to represent the activation of that dot/point.

Example 4: Reducing Trend and Systemic Component

In the activation signal for each dot/point, trend and systemic changes in signal still exist. To maximize the signal to noise ratio, the trend and systemic components were reduced using additional normalization. Voxels spatially close together were assumed to have similar trend and systemic components. Thus, the trend and systemic components of a ROI can be reduced by normalizing a ROI's activation ($A_{ROI}$) by comparing its activation to that of a nearby reference volume ($A_{ref}$) that is not be activated by a tensed muscle (activated BrainBraille dot/point). Reference volume voxels were found by thresholding on the activation map (t-scores) of when any one of the gestures are activated. Voxels with the aforementioned t-score that is less than 0.05 quantile for positive t-scores and more than 0.95 quantile for negative values are selected to be reference voxels ($V_{ref}$). When taking the normalization, gestures with activation localized to a single hemisphere (hands and feet) are only compared to a corresponding reference volume in the same hemisphere. Meanwhile, gestures involving activation in both hemispheres (gluteus maximus and tongue) use all $V_{ref}$. Since we focus on a synchronous input on the letter level, the activation timing reference point ($A^0$) is retaken for each time-window of interest. The new normalized BOLD activation for each ROI ($A_{NROI}$) is the difference in the relative change of BrainBraille dot ROI versus that of the its reference volume as specified by equation 1:

$$A^i_{N_{ROI}} = \frac{\left(A^i_{ROI} - A^0_{ROI}\right)}{A^0_{ROI}} - \frac{\left(A^i_{ref} - A^0_{ref}\right)}{A^0_{ref}} \tag{1}$$

The first aimed to find the best spatially distinguishable body parts in the motor cortex. Based on Lotze et al. and Meiir et al., the tongue, jaw, nose, shoulders, pectorals, hands, stomach, gluteus maximus, feet were chosen as candidates. After analyzing the results, a subset as final candidate body parts were selected. Based on these regions, a second series of experiments aiming to find the most independent six regions were conducted. The subject was presented cues that instructed the subject to tense different combinations of the final candidate body parts simultaneously.

The objective of the pilot studies was to select the six most spatially distinguishable and independent regions to map to the six BrainBraille dots/points in order to ensure the highest chance of success in the letter pattern recognition later.

Obtained from the first series of experiment, the spatially distinguishable body parts, their corresponding ROIs, and their reference voxels for normalization are shown in FIG. 5. The ROIs for jaw, nose, pectorals, and stomach were relatively less distinct. In addition, the pectoral regions blend into the shoulder regions, and the stomach region blends into the gluteus maximus regions. As a result, the tongue, shoulders, hands, gluteus maximus and feet were selected as the BrainBraille candidate body parts for this subject since they have relatively more distinguishable regions. In the second series of experiment, upon inspecting the BOLD activation curves of combinations of the final candidate regions, the shoulders and hands were discovered to be strongly correlated, and the left and right gluteus maximus were also strongly correlated. In particular, it was difficult to distinguish when a hand was activated versus when a hand and the shoulder on the same side was also activated. The subject also reported that some regions, for example the left and right gluteus maximus, were hard to control independently.

Thus, considering spatial distinguishability, motion independence and comfort for the user, the tongue, left hand, right hand, both gluteus maximus together, left foot and right foot were selected as the six BrainBraille dots/points for this subject.

Example 5: Braille Chorded System Method Validation

The BrainBraille alphabet was constructed based on the Braille alphabet as shown in FIGS. 4A and 4B. Tongue was mapped to the upper left dot, right hand upper right dot, left hand middle left dot, both gluteus maximus middle right dot, and feet the bottom two dots. Characteristics of the BOLD response were investigated first and then individual letter recognition was tested.

Visual cues of the BrainBraille letters were presented to the subject during an experiment of 10 runs. Each run consisted of the entire BrainBraille letters alphabet at random order. For each task (BrainBraille letter), the subject tensed the corresponding body parts. Each task lasted 6 s and there was a 12 s rest between tasks. The BOLD-fMRI scan was obtained with 40 slices, TR=750 ms.

Example 6: BOLD Response Analysis

Figure 9:
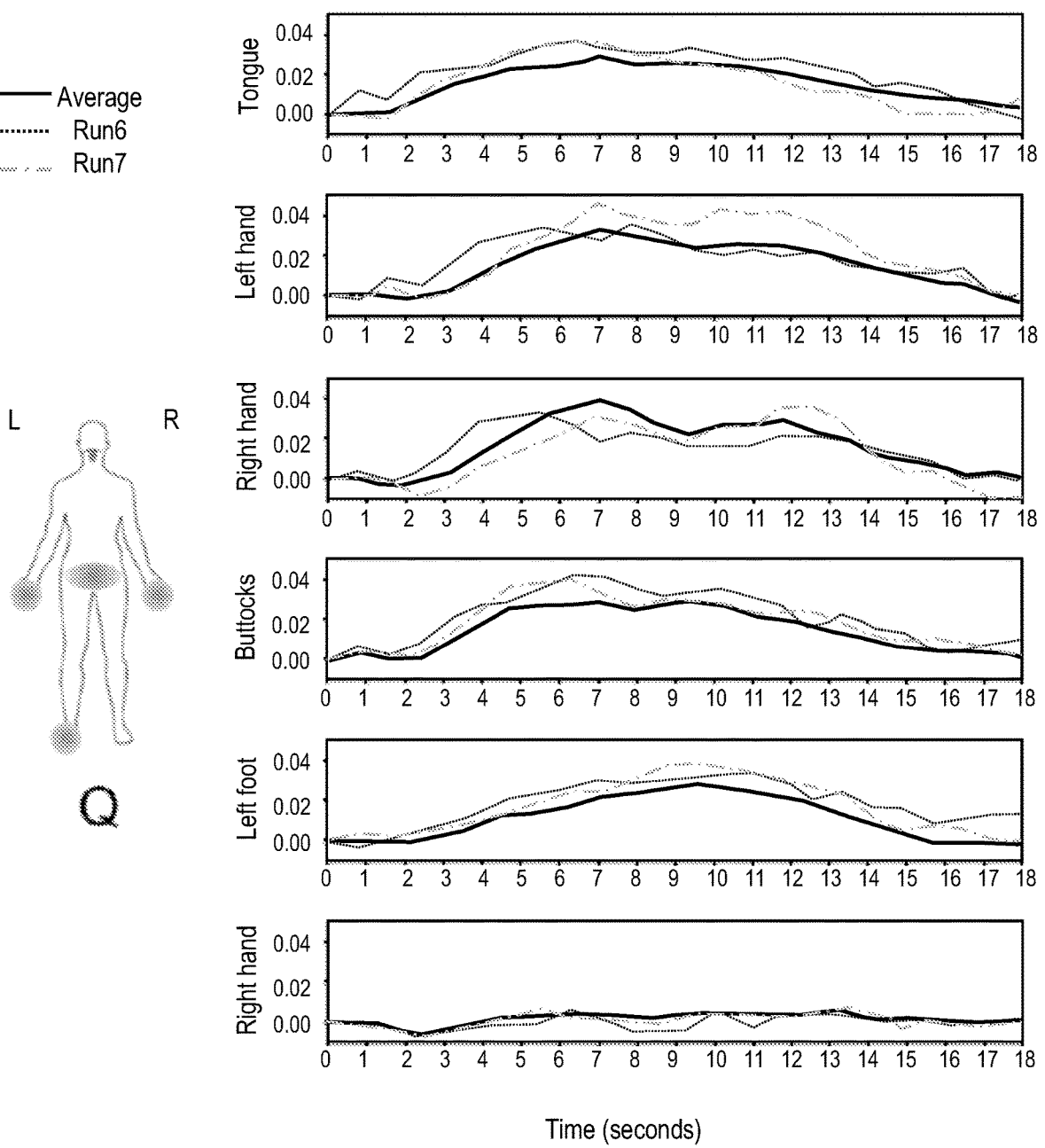
FIG. 9 provides an example BOLD response (%) versus time (sec) for a subject's executed, attempted, or imagined action for the letter "Q" with an example re-designed Braille dot alphabet mapped to different body parts, in accordance with an exemplary embodiment of the present disclosure.

The normalized BOLD response for each dot was studied to identify its characteristics. FIG. 9 shows an average of 10 runs and 2 example individual runs of the normalized BOLD curve for the letter Q, where the tongue, hands, gluteus maximus, and left foot showed clear activation and the right foot did not. Inspecting the average normalized activation curve reveals that: (1) The activation of a dot stayed high as the subject kept tensing the muscle; (2) The BOLD curve began to rise after a 2-4 s delay from when the cue was shown; (3) approximately 3 s was required to rise to a high level (>90% peak); and (4) 3-6 s were required to fall back to the resting state (<10% peak). These characteristics suggested that two activations would mutually affect each other if they are less than 9 s apart. A later analysis showed that approximately 3 s of rest was required between tensing of a muscle to see a dip in activation.

Example 7: Recognition of Braille Chorded System

An aggregation of support vector machines (SVM) were used for recognizing letters based on the normalized activation of each BrainBraille dot. The implementation was based on scikit-learn's support vector classifier (SVC) with a radial basis function (RBF) kernel. A naive approach would be to train a classifier to recognize the entire alphabet (26 classes). However, such an approach requires a lot more training samples to get good results. Since the BrainBraille dots selected have relatively independent activation, one SVM was for each BrainBraille dot to classify its inactivated/activated (0/1) state and then piece the results from all six dots together to decode the letter. Note that the data from all six dots were used in training the classifier in order to model the interactions among different BrainBraille dots. To do the classification, the time-series normalized activation data were first segmented into windows, each spanned from when the task cue was presented to the end of the following rest period. FIG. 9 shows such window for the letter Q. Then, within each window, feature extraction was performed for each BrainBraille dot. The feature vectors included all the raw normalized activation data, peak-to-peak, mean, median, area under the curve, and mean derivative value of the first half and the second half of the data. The range of each feature was scaled to the range of 0-1 based on the minimum and maximum value in the training set. Then, the SVM for each Braille dot was built. The hyper parameters (C and γ) of each SVM was tuned by a 10-fold leave-one-out cross validation with a log scale grid search.

Figure 11A:
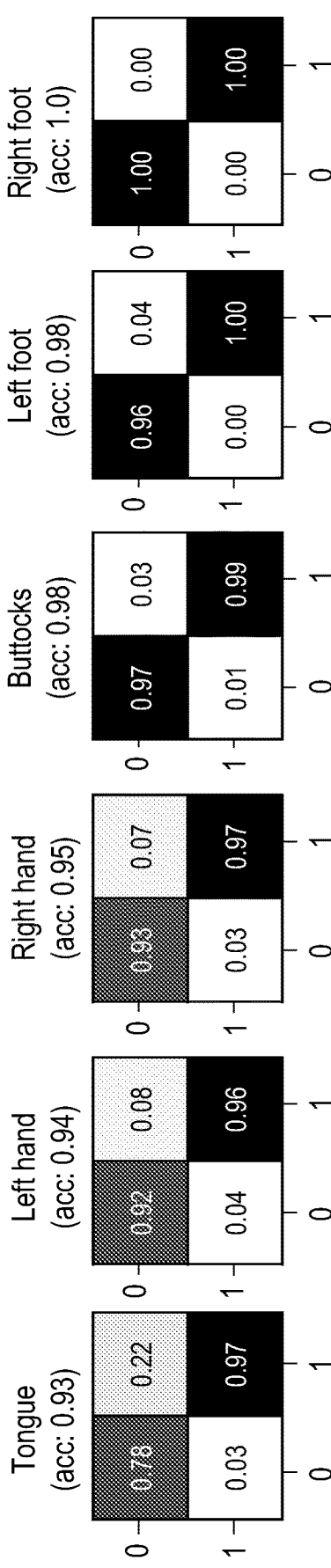
FIGS. 11A-11C show a classification accuracy and confusion matrix for the state of each individual Braille dot mapped to different body parts, in accordance with an exemplary embodiment of the present disclosure.

The evaluation results were obtained by a 10-fold leave-one-out cross validation. FIG. 11A shows the classification accuracy and confusion matrix for the state of each dot. Overall, the letter classification accuracy was 82%. Within the errors, invalid describing (pattern of recognized dots did not exist in the alphabet) was responsible for 4% error while wrong classification was responsible for the remaining 14%. Considering the subject performed some letters incorrectly, the results looked promising enough to continue.

Example 8: Braille Alphabet Re-Designed

To test the input speed limit of BrainBraille, the rest period between letters was removed, the input frequency was increased, and tasks that resembled the natural English language more were tested.

Based on the feedback from the previous experiment, it was more difficult for the subject to perform Braille with many simultaneous dots/points. However, in the Braille alphabet, some very frequently appearing letters, for example 'T,' has 4 dots. Thus, to make the system more user friendly, the BrainBraille layout was redesigned such that more letters frequently used in the English language were assigned to less dots patterns, while letters less frequently used were assigned to with many dot patterns. Further, dot patterns were designed to be symmetric if possible. FIG. 4B shows one variation of the re-designed BrainBraille alphabet.

The visual cue sequences were designed based on the most frequent 2-letter and 4-letter combinations plus a pangram to ensure all the letters were covered. An input interval of 6 s and 3 s was tested. The cues for the 6 s experiment were as follows: "*atoritherendestisedintised-inteanghasiouromeinteangofvearale*thequickbrownfox-jumpsover alazydog." The cues for the 3 s experiment were as follows: "*oftheintherwhicoulshalonthwoulikever-righaboutohiaftearthinhitothegreatthrebythesfirstilan ditwandh*thequickbrownfoxjumpsoveralazydog." The asterisk, "*," indicates a space (rest). For both sequences above, all letters and spaces were recognized. Each cue image displayed the current BrainBrialle letter at the left and a slightly blurred image of the next letter on the right, so the subject had time to prepare for the next letter. The BOLD-fMRI scans were obtained using 40 slices, TR=750 ms.

Example 9: Recognition of the Re-Designed Braille Chorded System

Figure 10:
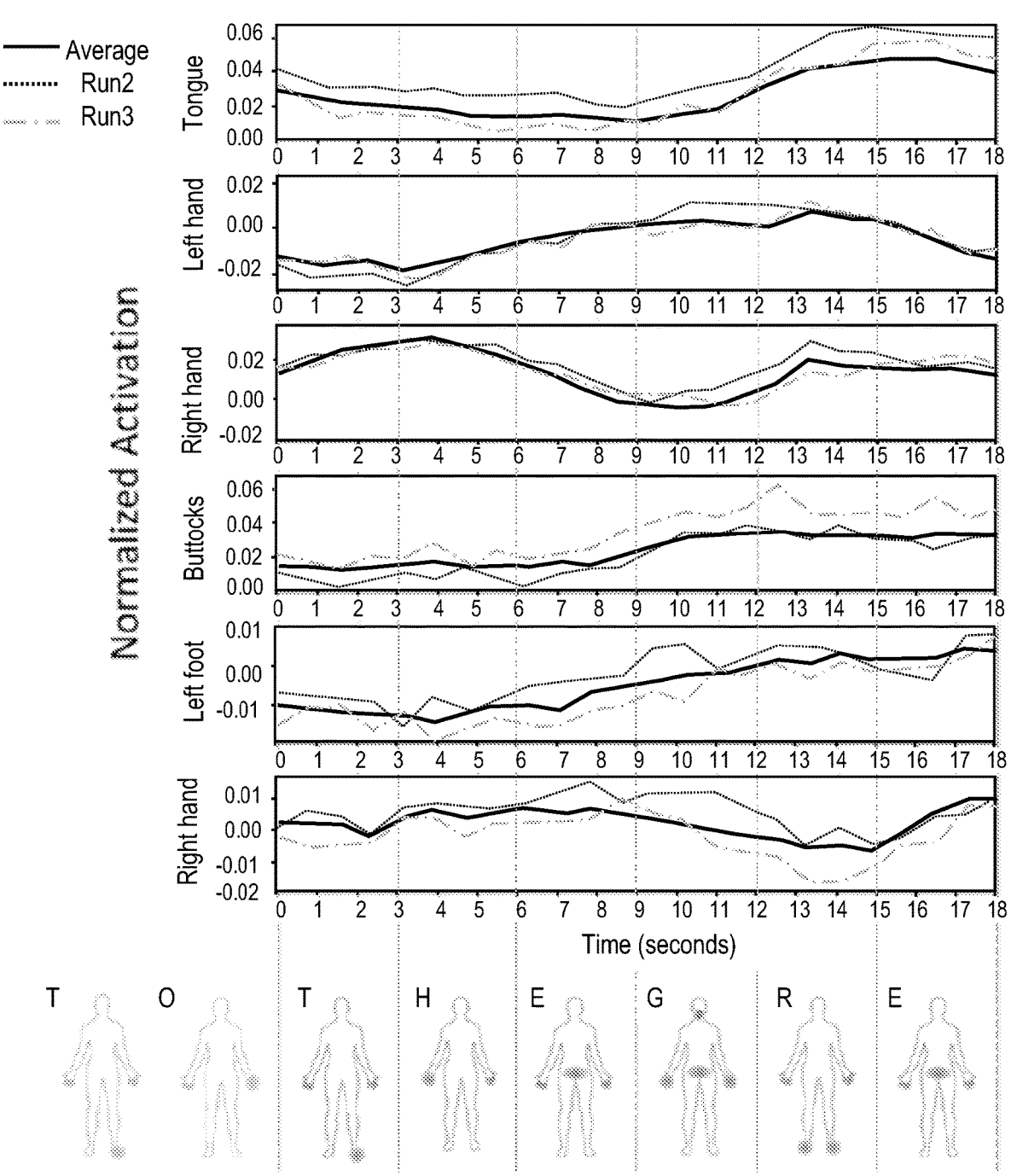
FIG. 10 provides an example BOLD response (%) versus time (sec) for a subject's executed, attempted, or imagined actions for the letter sequence "THEGRE" with an example re-designed Braille dot alphabet mapped to different body parts, in accordance with an exemplary embodiment of the present disclosure.

The recognition pipeline was very similar to that of the validation experiment but had some key differences. Guided by the previous BOLD curve analysis, a delay to the segmentation window for classification was added. Cross validation showed that a 3.75 s delay for the 6 s experiment and a 2.25 s delay for the 3 s experiment yielded the best results. Then, with the rest period removed between each letter task, previous analysis suggested that the BOLD response of a letter would at least affect letters around it, where each dot or task would have no clear activated or inactivated state. However, the transition between the states of each dot persisted relatively consistently. For example, FIG. 10 shows this effect in the case of a 3 s interval on the lettersequence "THEGRE" with leading "TO". For right hand, the curve first was increased due to the right hand activation in "O." The curve slowly fell down due to inactivity in "THE" and increased again due to "G". Though both "T" (2.25 s to 5.25 s) and "H" (5.25 s to 8.25 s) had inactive right hand, the shape and magnitude of the curve in the corresponding time periods were very different. On the contrary, for the same transitions, like "OT" (−0.75 s to 5.25 s) and "GR" (11.25 s to 16.25 s) for the right hand where both changed from active to inactive, the shape and magnitude of the curve remained similar.

Thus, for each BrainBraille dot, it was determined that transitions between two letters in all the letter pairs were recognized (e.g., recognized the "TH" and "HE" in the word "THE"). The length of the segmentation window was chosen to be twice the length of the interval window to cover both states. The labels of the classifications were the following transitions: inactive-inactive(00), inactive-active(01), active-active(11), and active-inactive(10), where "inactive"-0 and "active"-1. Same feature extraction, classifier model, and hyper parameter tuning procedures were applied to create the SVM classifier for each dot. The classifiers for all six dots were set to output the probability of the sample being in each of the four transition classes. Based on this information, it was easy to calculate the probabilities of the transition being in any one of all possible dot transition patterns (a total of $4^6$). To convert this probability into letter classification, a naive way would be to always choose the later letter in letter pairs that has the highest probability. As an example, for αβγ, if αβ had the highest probability of being "TH", then the letter prediction for β is "H". A better approach would be to combine the probability context of αβ and βγ. Treating them as independent, the joint probabilities of them can be calculated first, then summed over all possible dot states (a total of $2^6$) in β yields the combined probability of all possible states in β. To further correct possible errors, stochastic grammar based on the target letter's previous letter and next letter was also applied to weight each possible state's probability. A pre-computed conditional probability table of the center letter given the left and right letter around a center letter was used to assign this weight. The probability was computed using four different text corpora (Brown, Webtext, Reuters, and Gutemberg) provided in the python Natural Language Tool Kit(NLTK) package. Selected text corpora consisted of text from magazines, newspapers, editorial, web chats and electronics books, and text databases having 240k sentences with over a million words. A base probability of 0.5 (arbitrarily chosen) quantile of all positive probabilities in each condition was assigned so that it was still possible for users to input very uncommon letter combinations like "TTT". The optimal value for this threshold should be decided by cross validation on very large samples. This weighting process eliminated most of the invalid letter describing. Finally, if the output was still an invalid letter, the state with the highest probability among valid letters was selected as the output.

Figure 11B:
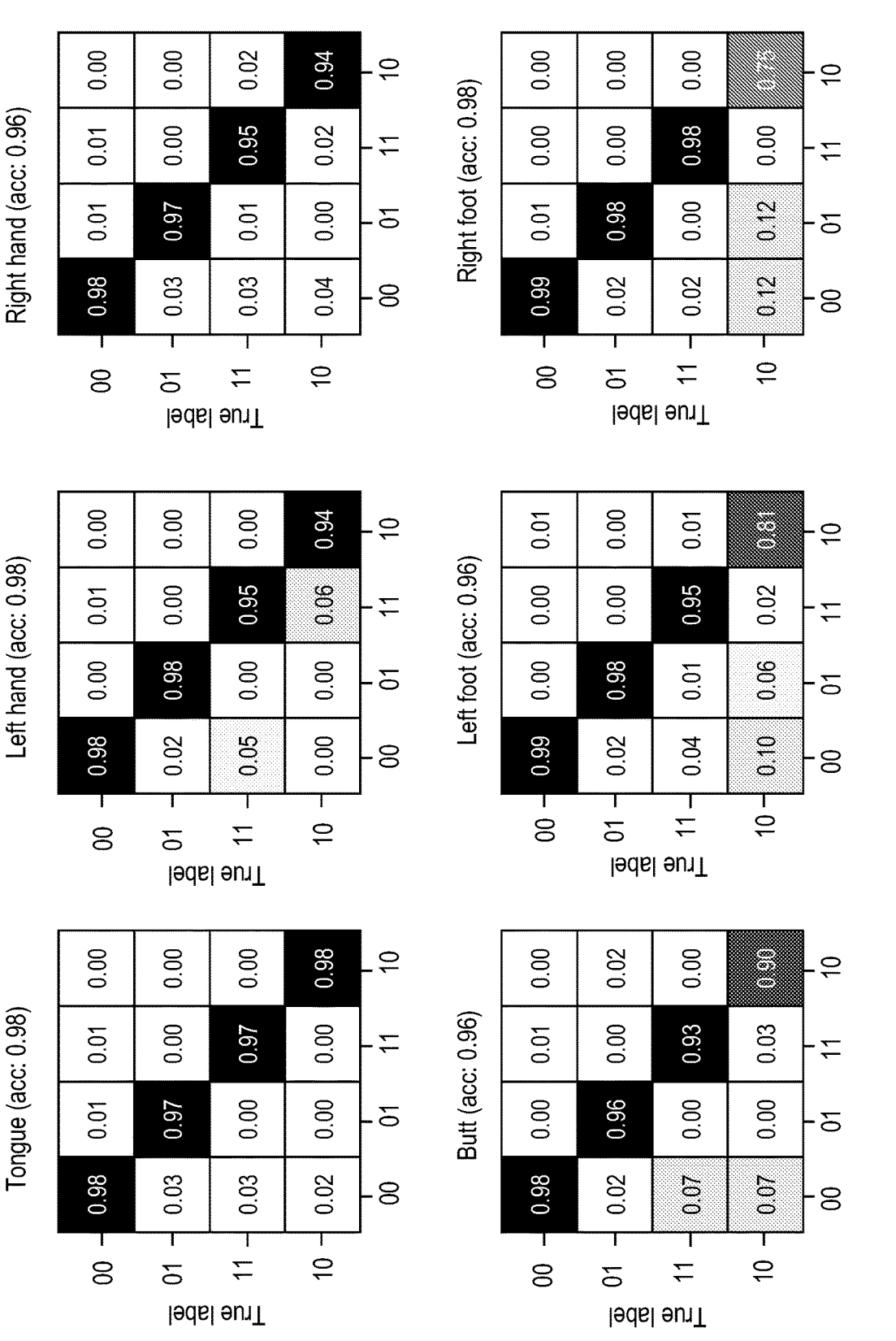
Figure 11C:
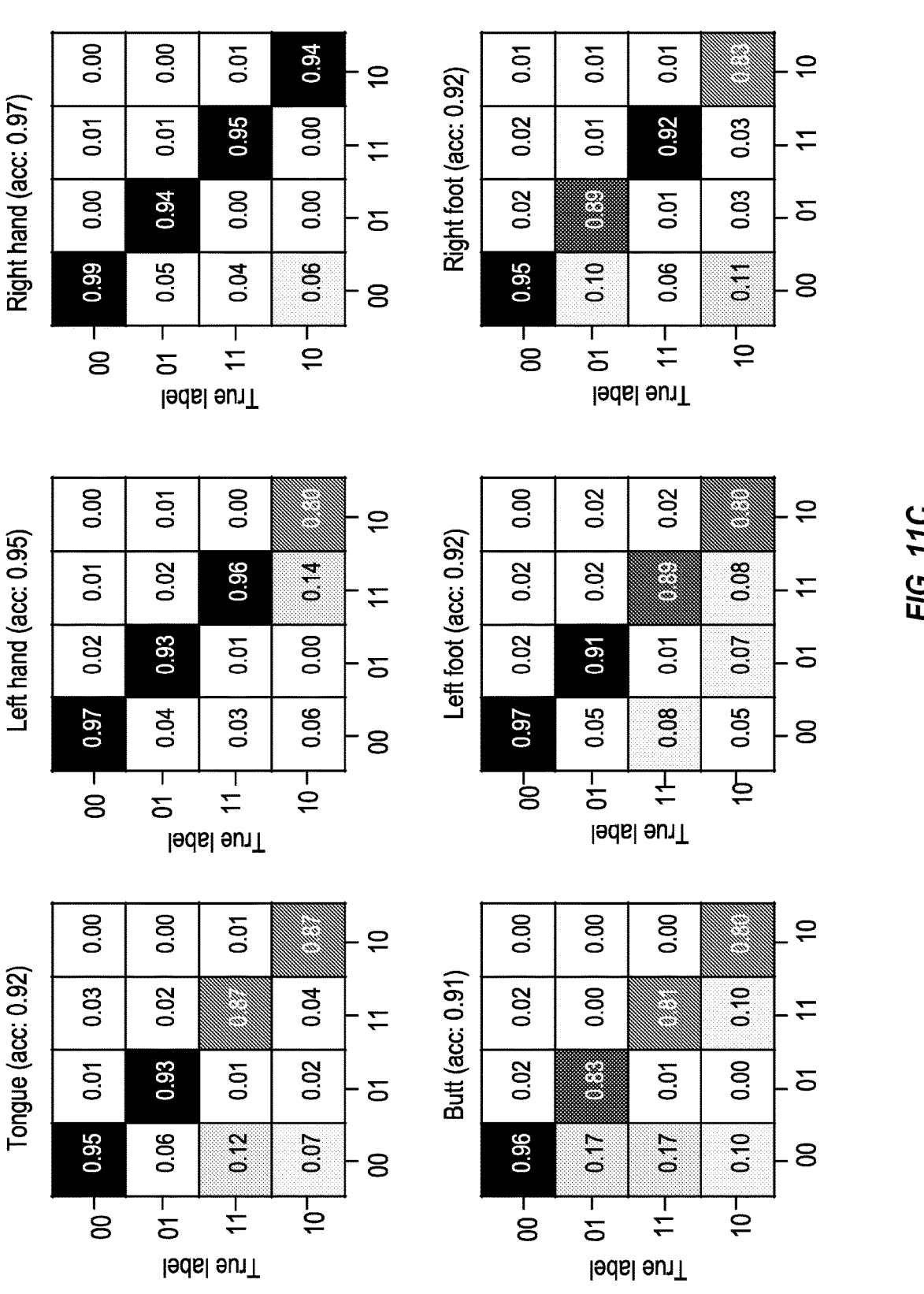

For each experiment, runs were discarded when the subject reported that he performed poorly (two of eight for the 6 s experiment and two of ten for the 3 s experiment). Accuracies were reported as the average of all combinations of leave-one-out cross validation. FIGS. 11B and 11C show the confusion matrix for the classifications of transitions of each dot. Table 1 below shows letter accuracies using the decoding methods described above. Incorporating context probabilities and stochastic grammar reduced the error significantly. The overall accuracy of letter classification for the 6 s (10 cpm) interval experiment was 99.23%. For the 3 s (20 cpm) interval experiment, the overall letter classification accuracy is 94.31%. Note that the accuracy of the pangram was lower because the subject reported having trouble performing "xjumps" and "lazydog" correctly. The effective accuracy and information transfer rate for each of the BrainBraille dots using the overall rates from letters and pangram is shown in Table 2 below. The overall information transfer rate (ITR) of the system is 58.95 bits per minute (bpm) for the 6 s interval experiment and 106.1 bpm for the 3 s interval experiment.

TABLE 1

Letter Accuracy Using Different Decoding Methods

| Accuracy | | Naive | With Context Probability | With Stochastic Grammar |
|---|---|---|---|---|
| 6 s Interval | Letters | 94.05% | 99.52% | 100.00% |
| | Pangram | 87.82% | 97.90% | 97.90% |
| | All | 91.78% | 98.93% | 99.23% |
| 3 s Interval | Letters | 84.47% | 93.20% | 94.90% |
| | Pangram | 80.88% | 92.28% | 92.65% |
| | All | 85.53% | 92.96% | 94.31% |

TABLE 2

Dot Recognition Accuracy and ITR Per Gesture

| BrainBraille Dot | Dot State Accuracy | | ITR per gesture | |
|---|---|---|---|---|
| | 6 s | 3 s | 6 s | 3 s |
| Left Hand | 99.85% | 98.77% | 0.9835 bit | 0.9043 bit |
| Right Hand | 99.95% | 98.77% | 0.9580 bit | 0.9043 bit |
| Left Foot | 100.00% | 98.35% | 1.0000 bit | 0.8789 bit |
| Right Foot | 99.85% | 98.20% | 0.9836 bit | 0.8701 bit |
| Tongue | 99.70% | 98.48% | 0.9702 bit | 0.8867 bit |
| Gluteus Maximus | 100.00% | 98.01% | 1.0000 bit | 0.8592 bit |

By using multiple regions of the brain simultaneously and detecting the changes of activation during the transition of one letter to another at scheduled times, BrainBraille achieved a 106.1 bpm ITR. Similar rates are also possible using fNIR. Information transfer and typing rates may increase through decreasing the time interval, improving the subject's accuracy, and using more brain regions to convey more bits per time interval (one form of Braille uses eight dots per cell). Analysis of typing errors indicated that letters with more dots are more difficult to perform. Thus, the alphabet can be optimized based on letter frequency and dot accuracy to use the minimum number of simultaneous dots. When decreasing the time interval, on-off-on transitions were not noticeable without the dot being off for three seconds. However, we discovered that the alphabet can be mapped such that letter triplets at 1.5 s were unlikely to have a given dot off for just 1.5 s, and most triplets are distinct. Thus, typing rates of 40 cpm are possible.

Example 10: Communication System Using Braille Chorded System

By iterating between fMRI and fNIR, a communication system that uses brain regions that may be monitored by devices that look like normal consumer electronics, such as earphones or eyeglasses. Optimally, regions that can be controlled unobtrusively by a mobile device user can be discovered. A remaining issue, however, is how a new user of BrainBraille or its optimized descendent would learn the system of communication. Fortunately, we have discovered a phenomenon called Passive Haptic Learning (PHL), where one can learn a manual skill like playing piano, keying Morse code, or typing Braille without active effort. We posit that the same effect is possible for someone who wants to learn a BCI.

As shown in FIGS. 8A-8D, wearable PHL devices with six vibrating motors were designed to stimulate six areas of the body (e.g., both hands, feet, and shoulders) corresponding to six Braille dots. Throughout the day, as the user wears the system, he hears words and letters repeatedly from a pangram (e.g., "When zombies arrive, quickly fax judge Pat") coupled with the appropriate stimulation representing the dots. In previous studies using the fingers, participants learned the alphabet in four hours while attending other tasks. However, transitioning the learning to the linguistic centers of the brain such that a chorded system, such as Braille, becomes automatic to the participant, will take longer.

Functional MRI scans were used to determine when Braille becomes a linguistic process for the participant as opposed to a motor mimicking process. When an experienced Braille participant attempts to communicate with Braille in the fMRI, the machine sees distinguishing surface activations in the temporal lobe (Broca's and Wernicke's areas) as well as the motor cortex (such surface activations are necessary for accurate sensing with fNIR, whereas fMRI can monitor the entire brain). PHL is useful for teaching a subject more complicated versions of contracted Braille or attempt to augment Braille with additional dots for faster communication. PHL speeds the learning of such complicated systems.

Subjects were taught to "type" Braille with both traditional fingers and other body parts (e.g., shoulders and feet), which was monitored using real-time feedback on the fMRI to tune which parts were most distinguishable for the fMRI and for a fNIR system. The system was tuned to attempt to sense BrainBraille as rapidly and accurately as possible.

Example 11: Enabling a Path to Consumer BCI Hardware

To perform mobile fNIR testing of the BrainBraille concept, a Nirx NIRSport and an Artinis Bright24 were used. Both of these systems support real-time testing, and variants of the systems can be used while recording in a fMRI. Specific locations on the head were determined most effective for communication and observation of brain activity and conventional consumer electronics hardware (headphones, eyeglasses, etc.) were considered for potential adaptation. BrainBraille demonstrates a path to achieving world record BCI information transfer rates in a non-invasive, consumer-appropriate form factor such as a pair of headphones. Brain changes due to PHL are demonstrated by BrainBraille such that a new way of silently communicating may improve the abilities of ALS patients to communicate.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way.

What is claimed is:

1. A method comprising:

receiving, by one or more processors and via a brain-activity sensing apparatus comprising one or more non-invasive sensors positioned proximate a head of a subject and in communication with the one or more processors, one or more signals representative of activity occurring in a brain of the subject, the activity being associated with one or more spatiotemporal movements of one or more portions of a body of the subject;

correlating, by the one or more processors, the received one or more signals to one or more portions of a coded language system by (i) extracting, by the one or more processors, one or more spatiotemporal neural activation features from the received one or more signals, wherein the extracted spatiotemporal neural activation features correspond to motor representations of the one or more portions of the body of the subject, and (ii) mapping the extracted spatiotemporal neural activation features to the one or more portions of the coded language system based on an association between neural activation patterns and the motor representations;

outputting, by the one or more processors, the one or more portions of the coded language system; and demonstrating, as part of the outputting, one or more of the spatiotemporal movements associated with the one or more portions of the coded language system by applying one or more sensory stimuli to the subject that are configured to demonstrate or validate the spatiotemporal movements associated with the mapped portions of the coded language system.

2. The method of claim 1, wherein:

one or more of the stimuli is selected from a group consisting of auditory stimuli, visual stimuli, tactile stimuli, gustatory stimuli, olfactory stimuli, and any combinations thereof.

3. The method of claim 2, wherein at least one of the one or more stimuli comprises a tactile stimulation of one or more of the portions of the body of the subject.

4. The method of claim 3, wherein one of more of the portions of the body of the subject is selected from a group consisting of an organ, a muscle, a tendon, a joint, a bone, skin, cartilage, and any combinations thereof.

5. The method of claim 3, wherein one of more of the portions of the body of the subject is selected from a group consisting of an eye, an ear, a mandible, a temple, a tongue, teeth, a buccal, a shoulder, a bicep, an elbow, a hand, a wrist, a finger, a fingernail, an abdominal, a buttocks, a thigh, a knee, an ankle, a foot, an ankle bone, a toe, a toenail, and any combinations thereof.

6. The method of claim 3, wherein the tactile stimulation is selected from a group consisting of temporally separated tactile stimuli, vibrational tactile stimulation, electrical tactile stimulation, and any combinations thereof.

7. The method of claim 3, wherein the tactile stimulation comprises electrical tactile stimulation selected from a group consisting of electrical muscle stimulation, transcutaneous electrical nerve stimulation, functional electrical stimulation, neuromuscular electrical stimulation, Russian electrical stimulation, and any combinations thereof.

8. The method of claim 1, wherein one or more of the spatiotemporal movements is selected from a group consisting of executed actions, attempted actions, imagined actions, and any combinations thereof.

9. The method of claim 1, wherein the coded language system comprises text.

10. The method of claim 9, wherein the text is associated to a chorded system.

11. The method of claim 10, wherein the chorded system comprises less than N-points; and wherein N is less than 27.

12. The method of claim 10, wherein the chorded system is selected from a group consisting of Braille, CyKey, SiWriter, GKOS, EkaPad, FrogPad, Decatxt, Twiddler, ASETNIOP, stenotype, velotype, Microwriter, and any combinations thereof.

13. The method of claim 1, wherein the one or more non-invasive sensors is selected from a group consisting of a brain-computer interface, a functional magnetic resonance imaging (fMRI) system, a functional near infrared (fNIR) imaging system, a positron emission tomography (PET) imaging system, an electroencephalogram (EEG) system, a transcranial magnetic stimulation (TMS) system, and any combinations thereof.

14. The method of claim 1, wherein at least one of the one or more signals is indicative of a blood oxygenation level-dependent (BOLD) response in the subject.

15. The method of claim 1 further comprising:

outputting at least one portion of the one or more portions of the coded language system into speech.

16. The method of claim 1 further comprising:

silently and non-visually communicating portions of the coded language system at over 50 bits per minute (bpm).

17. The method of claim 1 further comprising:

silently and non-visually communicating portions of the coded language system at over 100 bits per minute (bpm).

18. The method of claim 1, wherein the spatiotemporal neural activation features comprise one or more characteristics selected from temporal separation, activation amplitude, spatial distribution, activation sequence, or combinations thereof.

19. The method of claim 1, wherein applying the one or more sensory stimuli comprises eliciting a neural response used to validate or refine the extraction of the spatiotemporal neural activation features.

\* \* \* \* \*